US010380668B2

(12) United States Patent
Jung

(10) Patent No.: US 10,380,668 B2
(45) Date of Patent: Aug. 13, 2019

(54) METHOD, MEDIUM, AND SYSTEM FOR MANAGING A VEHICLE TRANSPORT SERVICE

(71) Applicant: SAMSUNG ELECTRONICS CO., LTD., Suwon-si, Gyeonggi-do (KR)

(72) Inventor: Byung-min Jung, Seongnam (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 695 days.

(21) Appl. No.: 13/974,201

(22) Filed: Aug. 23, 2013

(65) Prior Publication Data
US 2014/0058896 A1   Feb. 27, 2014

(30) Foreign Application Priority Data
Aug. 24, 2012   (KR) ......................... 10-2012-0093249

(51) Int. Cl.
*G06Q 30/00*   (2012.01)
*G06Q 30/06*   (2012.01)
(Continued)

(52) U.S. Cl.
CPC ......... *G06Q 30/0623* (2013.01); *G06Q 10/02* (2013.01); *G06Q 50/30* (2013.01);
(Continued)

(58) Field of Classification Search
CPC ................... G06Q 10/02; G06Q 50/30; G06Q 30/0601–0645; G06Q 30/0623; G08G 1/202; H04W 4/008; H04W 4/02
(Continued)

(56) References Cited

U.S. PATENT DOCUMENTS 6,456,207 B1 *  9/2002  Yen ..................... G08G 1/202
                                                       235/384
6,774,782 B2    8/2004  Runyon et al.
(Continued)

FOREIGN PATENT DOCUMENTS

CN   101520950   9/2009
CN   102158804   8/2011
(Continued)

OTHER PUBLICATIONS

Fu, Ying, et al. "Dynamic ride sharing community service on traffic information grid." 2008 International Conference on Intelligent Computation Technology and Automation (ICICTA). vol. 2. IEEE, 2008. (Year: 2008).*

(Continued)

*Primary Examiner* — Matthew E Zimmerman
(74) *Attorney, Agent, or Firm* — Staas & Halsey LLP

(57) ABSTRACT

A method by which a mobile terminal provides transport service information, the method including transmitting information regarding a user and information regarding a transport service preferred by the user to a transport service managing server, for the user's use of the transport service; receiving information regarding transport service providing means corresponding to the information regarding the transport service preferred by the user, from the transport service managing server; and confirming the user's use of the transport service based on the information regarding the transport service providing means received from the transport service managing server and information acquired from the transport service providing means via a short-range wireless communication by the mobile terminal, when the transport service providing means is available for providing the transport service.

15 Claims, 20 Drawing Sheets

(51) Int. Cl.
  *G06Q 10/02* (2012.01)
  *G06Q 50/30* (2012.01)
  *G08G 1/00* (2006.01)
  *H04W 4/02* (2018.01)
  *H04W 4/80* (2018.01)

(52) U.S. Cl.
  CPC .............. *G08G 1/202* (2013.01); *H04W 4/02* (2013.01); *H04W 4/80* (2018.02)

(58) Field of Classification Search
  USPC ................................................ 705/26.1–27.2
  See application file for complete search history.

(56) References Cited

U.S. PATENT DOCUMENTS

| | | | | |
|---|---|---|---|---|
| 8,805,603 | B1* | 8/2014 | Cavallaro Kozlowski | ................... H04M 3/487 701/24 |
| 2001/0037174 | A1* | 11/2001 | Dickerson | ............. G07B 15/00 701/400 |
| 2004/0049424 | A1* | 3/2004 | Murray | ................... G06Q 10/04 705/14.14 |
| 2004/0076280 | A1* | 4/2004 | Ando | ..................... G08G 1/202 379/220.01 |
| 2005/0014486 | A1* | 1/2005 | Shimizu | ................. G06Q 10/10 455/412.1 |
| 2006/0059023 | A1* | 3/2006 | Mashinsky | ............ G06Q 10/02 705/5 |
| 2008/0228562 | A1* | 9/2008 | Smith | .................... G06Q 10/08 705/13 |
| 2008/0305787 | A1* | 12/2008 | Yamada | ................ H04W 88/04 455/426.1 |
| 2009/0248587 | A1* | 10/2009 | Van Buskirk | .......... G06Q 10/06 705/80 |
| 2009/0313077 | A1* | 12/2009 | Wheeler, IV | .......... G01C 21/26 705/7.14 |
| 2010/0159955 | A1* | 6/2010 | Aerrabotu | ........... G06F 17/3087 455/456.3 |
| 2011/0009098 | A1* | 1/2011 | Kong | ..................... G06Q 10/02 455/414.1 |
| 2011/0053552 | A1* | 3/2011 | Kim | ................... G01C 21/3438 455/404.2 |
| 2011/0313804 | A1* | 12/2011 | Camp | ..................... G06Q 10/02 705/7.13 |
| 2012/0041675 | A1* | 2/2012 | Juliver | ................... G06Q 10/08 701/465 |
| 2012/0203599 | A1* | 8/2012 | Choi | ...................... G06Q 30/02 705/13 |
| 2013/0246301 | A1* | 9/2013 | Radhakrishnan | .. G06Q 30/0282 705/347 |
| 2013/0342314 | A1* | 12/2013 | Chen | .................. G07C 9/00309 340/5.65 |

FOREIGN PATENT DOCUMENTS

| | | |
|---|---|---|
| CN | 102496130 | 6/2012 |
| JP | 10-105889 | 4/1998 |
| JP | 3389428 | 1/2003 |
| JP | 2005-174177 | 6/2005 |
| JP | 2009-146300 | 7/2009 |
| KR | 10-0752871 | 8/2007 |
| KR | 10-2008-0102517 | 11/2008 |
| KR | 10-2010-0066328 | 6/2010 |
| KR | 10-2010-0133555 | 12/2010 |
| KR | 10-2011-0116913 | 10/2011 |
| KR | 10-2012-0040478 | 4/2012 |
| KR | 10-2012-0090445 | 8/2012 |

OTHER PUBLICATIONS

Extended European Search Report dated Jan. 25, 2016 in corresponding European Patent Application No. 13830696.4.
PCT International Search Report and Written Opinion of the International Searching Authority dated Dec. 13, 2013 in corresponding International Patent Application No. PCT/KR2013/007597.
European Office Action dated Nov. 16, 2016 in corresponding European Patent Application No. 13 830 696.4, 4 pages.
Chinese Office Action dated Sep. 11, 2017 in Chinese Patent Application No. 201380047384.6.
Chinese Office Action dated Mar. 30, 2018 in Chinese Patent Application No. 201380047384.6.
Korean Office Action dated Jul. 20, 2018 in Korean Patent Application No. 10-2012-0093249.
Korean Office Action dated Jan. 31, 2019 in Korean Patent Application No. 10-2012-0093249.
Korean Office Action dated Apr. 3, 2019 in Korean Patent Application No. 10-2012-0093249.
Chinese Office Action dated Feb. 19, 2019 in Chinese Patent Application No. 201380047384.6.
European Office Action dated Jan. 28, 2019 in European Patent Application No. 13830696.4.

* cited by examiner

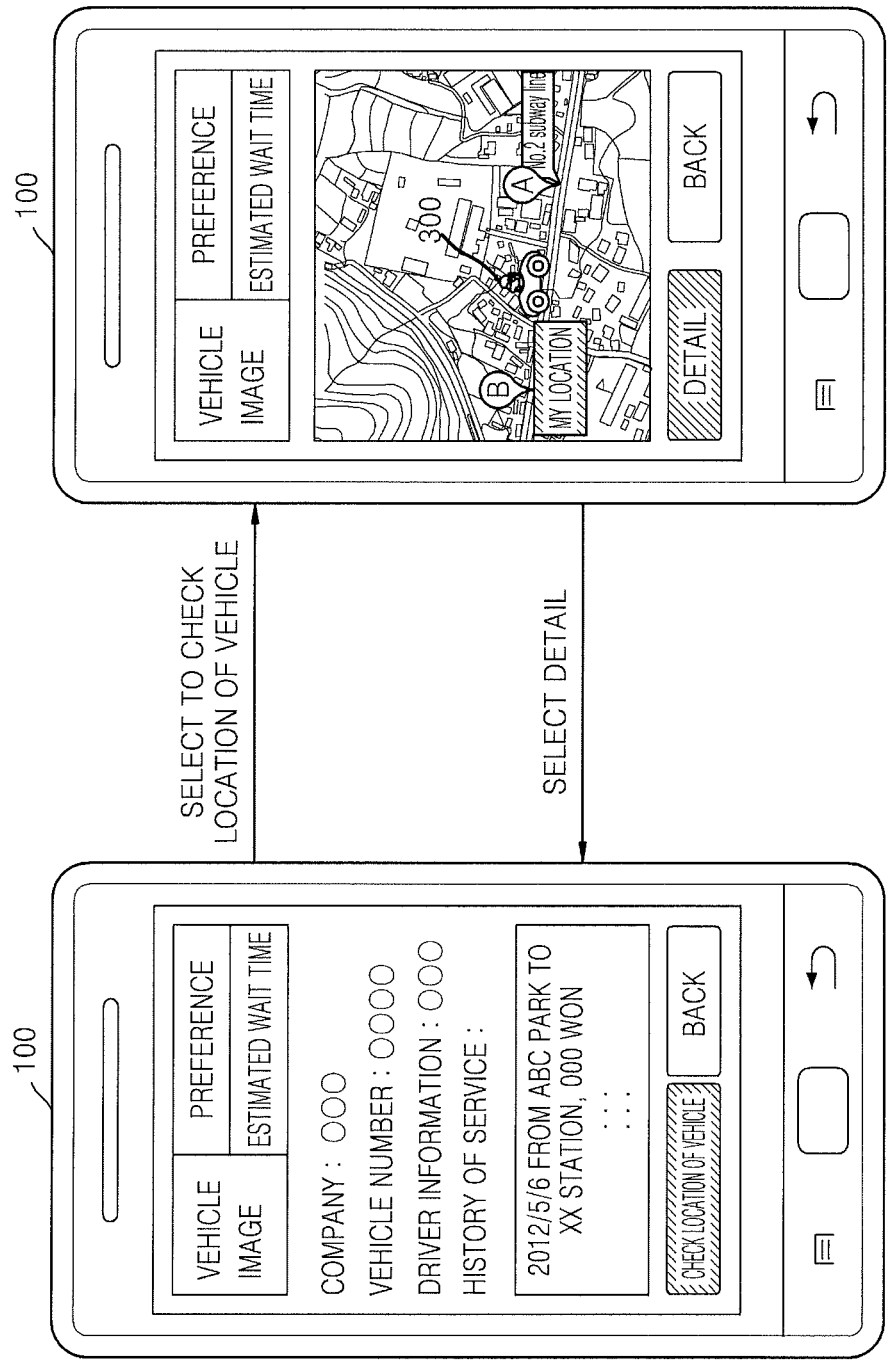

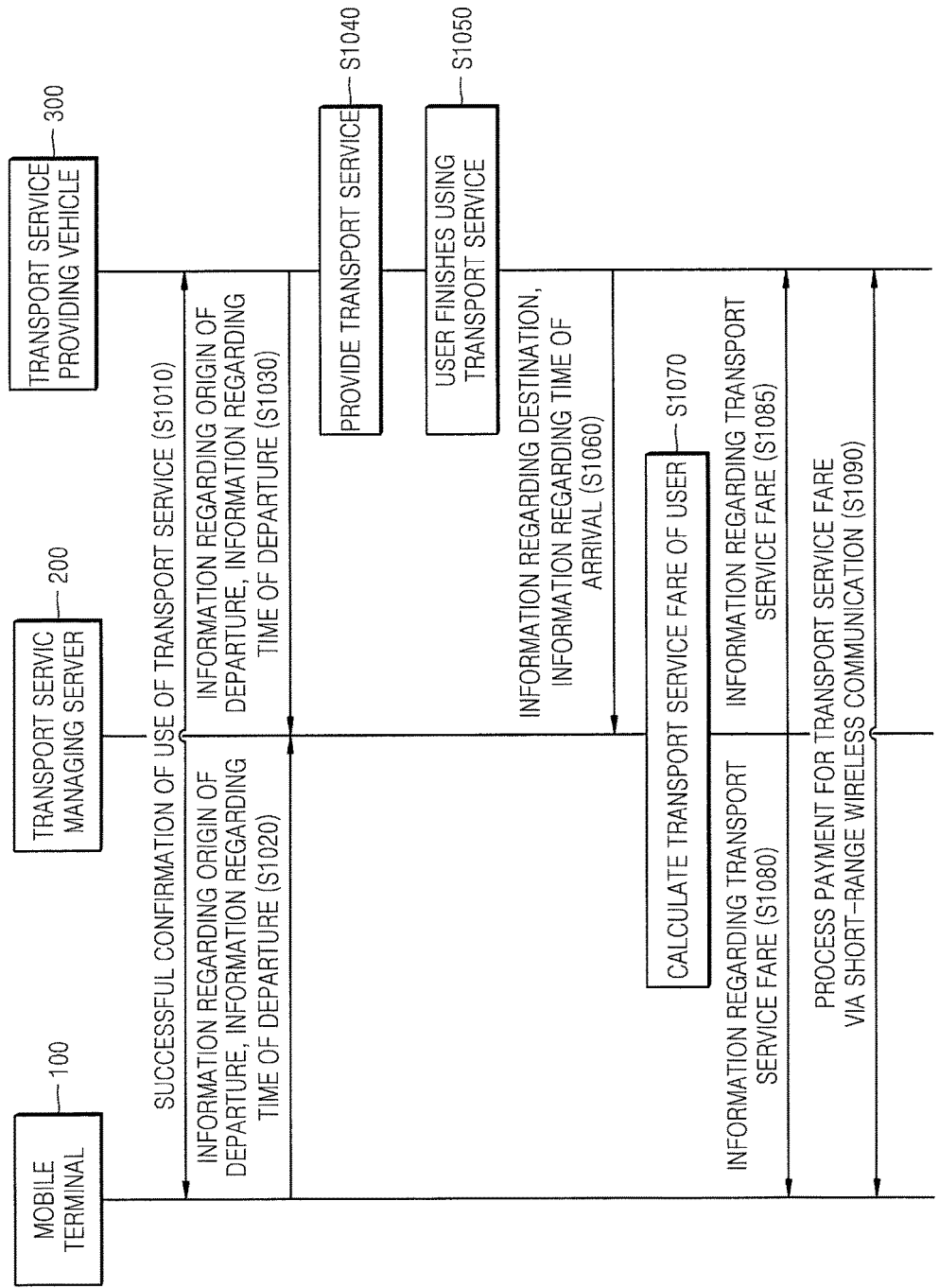

FIG. 11A
FIG. 11B
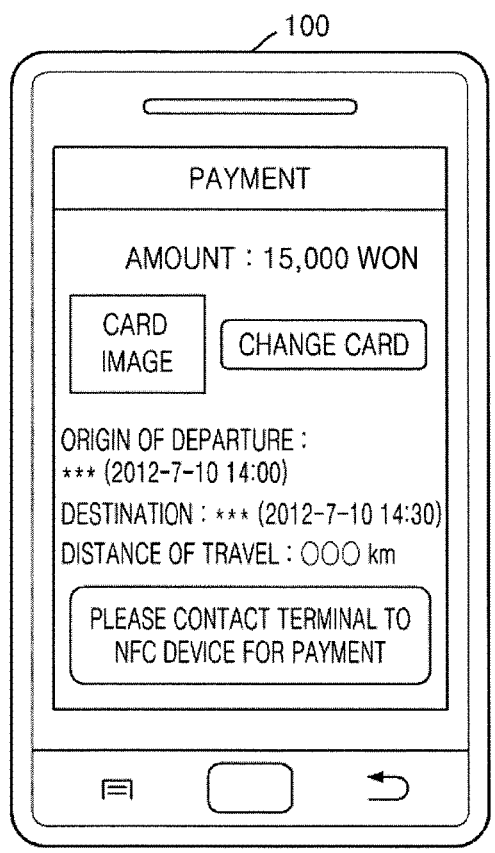
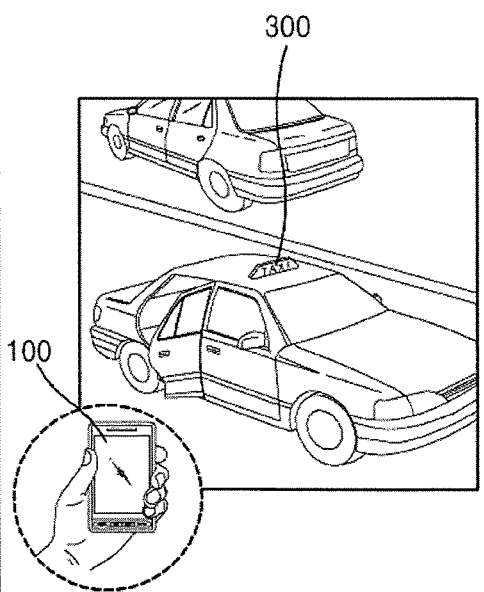

METHOD, MEDIUM, AND SYSTEM FOR MANAGING A VEHICLE TRANSPORT SERVICE

CROSS-REFERENCE TO RELATED APPLICATIONS

This application claims the benefit of Korean Patent Application No. 10-2012-0093249, filed on Aug. 24, 2012, in the Korean Intellectual Property Office, the disclosure of which is incorporated herein in its entirety by reference.

BACKGROUND

1. Field

Embodiments of the present invention relate to a method of providing transport service information via a mobile terminal, a method of managing transport service information in a transport service managing service, and a method of providing transport service information via a transport service providing vehicle.

2. Description of the Related Art

When a passenger wants to use a taxi as transportation, it may be difficult to find an appropriate taxi service company. Furthermore, in consideration of increase of crimes using taxis, a drunken passenger, a female passenger, or a child passenger may need references for a taxi or a taxi driver. Furthermore, passengers are experiencing inconveniences due to cheating behaviors (e.g., cheating ride fare, illegal cab sharing, unjust refusal of a passenger) of some taxi drivers.

Therefore, a system for providing safe transport service to passengers is needed.

SUMMARY

Embodiments of present invention provide a method of providing transport service information via a mobile terminal based on a confirmation between the mobile terminal and a transport service providing means (transport service provider), a method of managing transport service information in a transport service managing service, and a method of providing transport service information via a transport service providing vehicle Embodiments of the present invention also provide a method of providing transport service information via a mobile terminal for providing safe transport service to a user, a method of managing transport service information in a transport service managing service, and a method of providing transport service information via a transport service providing vehicle.

According to an aspect of the present invention, there is provided a method by which a mobile terminal provides transport service information, the method including transmitting information regarding a user and information regarding a transport service preferred by the user to a transport service managing server, for the user's use of the transport service; receiving information regarding transport service providing means corresponding to the information regarding the transport service preferred by the user, from the transport service managing server; and confirming the user's use of the transport service based on the information regarding the transport service providing means received from the transport service managing server and information acquired from the transport service providing means via a short-range wireless communication by the mobile terminal, when the transport service providing means is available for providing the transport service.

The method further includes acquiring link information for communicating with the transport service managing server.

The acquiring of the link information includes acquiring the link information via at least one of a short-range wireless communication, a barcode, and an application.

The method further includes displaying at least a part of the received information regarding the transport service providing means.

The information regarding the transport service preferred by the user includes at least one of information regarding conditions for a vehicle, information regarding conditions for a driver, information regarding an origin of departure, information regarding a destination, and information regarding payment methods.

The information regarding conditions for a vehicle includes at least one of information regarding type of the vehicle, information regarding color of the vehicle, information regarding the maximum number of passengers, information regarding additional equipment on the vehicle information regarding out-of-factory date of the vehicle, information regarding accident history of the vehicle, information regarding total mileage of the vehicle, and information regarding terms the vehicle was rented for, and the information regarding conditions for a driver includes at least one of gender of the driver, age of the driver, driving experience of the driver, and user evaluations on the driver.

The information regarding transport service providing means includes at least one of identification information regarding a vehicle, information regarding a current location of the vehicle, information regarding estimated time of arrival, information regarding a driver, information regarding user evaluations, information regarding authentication, and information regarding estimated amount for payment.

The receiving of the information regarding transport service providing means includes receiving a list of a plurality of transport service providing means corresponding to the information regarding the transport service preferred by the user from the transport service managing server; and receiving a user selection of at least one transport service providing means from the list of the plurality of transport service providing means.

The list of transport service providing means includes information regarding at least one of identification information, current locations, wait times, operation status, driver identifications, and user evaluations regarding the respective vehicles corresponding to the information regarding the transport service preferred by the user.

The confirming of the user includes acquiring the information regarding transport service providing means from the transport service providing means via at least one of a short-range wireless communication, BLUETOOTH, Wi-Fi, WFD, UWB, ZIGBEE, a 2D barcode, and a color code.

The confirming of the user's use of the transport service includes comparing the information acquired from the transport service providing means via the short-range wireless communication to the information regarding the transport service providing means received from the transport service managing server.

The method further includes, as the user finishes using the transport service, processing a payment via the short-range wireless communication with the transport service providing means.

The processing of the payment includes transmitting information regarding payment methods associated with the user to the transport service providing means via the short-range wireless communication.

The method further includes transmitting information regarding the user's evaluations on the transport service providing means to the transport service managing server.

The method further includes adding the transport service providing means to a favorite menu based on an input of the user.

According to another aspect of the present invention, there is provided a method by which a transport service managing server manages transport service, the method including receiving information regarding a user and information regarding a transport service preferred by the user from a mobile terminal, for the user's use of the transport service; extracting transport service providing means corresponding to the information regarding the transport service preferred by the user; transmitting information regarding the transport service providing means to the mobile terminal; and transmitting service request information including the information regarding the user to the transport service providing means, wherein, the information regarding transport service providing means is information for confirming the user's use of the transport service.

The method further includes, when the transport service providing means is available for providing the transport service, receiving, from the mobile terminal, a result of confirming the user's use of the transport service on the mobile terminal based on information acquired from the transport service providing means via a short-range wireless communication and information regarding the transport service providing means received from the transport service managing server.

The extracting of the transport service providing means includes extracting a plurality of transport service providing means corresponding to the information regarding the transport service preferred by the user; transmitting a list of the plurality of transport service providing means to the mobile terminal; and receiving a user selection regarding at least one transport service providing means from the list of the plurality of transport service providing means from the mobile terminal.

The method further includes, when the user's use of the transport service is successfully confirmed on the mobile terminal, receiving information regarding an origin of departure and information regarding time of departure from the mobile terminal or the transport service providing means.

The method further includes, when the transport service providing means arrives at a destination of the user, receiving information regarding the destination and information regarding time of arrival from the transport service providing means or the mobile terminal.

The method further includes calculating transport service fare of the user based on the information regarding the origin of departure, the information regarding time of departure, the information regarding the destination, and the information regarding time of arrival; and transmitting information regarding the transport service fare to at least one from between the mobile terminal and the transport service providing means.

The transmitting of the service request information includes transmitting at least one of identification information of the user, contact information of the user, and information regarding a location of the user to the transport service providing means.

The method further includes, when the user finishes using the transport service, receiving information regarding user evaluations on the transport service providing means from the mobile terminal.

The method further includes receiving a request to add the transport service providing means to a favorite menu based on an input of the user.

According to another aspect of the present invention, there is provided a method by which a transport service providing vehicle provides a transport service, the method including receiving, from a transport service managing server, a service request information including information regarding a user who wants to use the transport service; and transmitting information for confirming the user's use of the transport service to a mobile terminal of the user via a short-range wireless communication, when the transport service providing vehicle is available for providing transport service to the user, wherein the information for confirming the user's use of the transport service includes at least one from between information regarding the transport service providing vehicle and information regarding a driver thereof.

The information regarding the user includes at least one of identification information of the user, contact information of the user, and information regarding a location of the user.

The information for confirming the user's use of the transport service is compared to information regarding transport service providing means received from the transport service managing server on the mobile terminal.

The method further includes confirming the user based on a user information acquired from the mobile terminal via the short-range wireless communication and a user information received from the transport service managing server.

The method further includes, when the transport service providing vehicle arrives at a destination of the user, transmitting information regarding the destination and information regarding time of arrival to the transport service managing server.

The method further includes, when the user finishes using the transport service, receiving information regarding transport service fare of the user from the transport service managing server.

The method further includes receiving information regarding payment methods associated with the user from the mobile terminal of the user via the short-range wireless communication; and processing a payment for the transport service fare based on the information regarding payment methods.

The method further includes, when the user finishes using the transport service, receiving information regarding user evaluations on the transport service providing vehicle from the transport service managing server.

According to another aspect of the present invention, there is provided a mobile terminal including a communication unit, which, transmits information regarding a user and information regarding a transport service preferred by the user to a transport service managing server for the user's use of the transport service and receives information regarding transport service providing means corresponding to the information regarding the transport service preferred by the user, from the transport service managing server; and a control unit, which, confirms the user's use of the transport service based on the information regarding the transport service providing means received from the transport service managing server and information acquired from the transport service providing means via a short-range wireless communication by the mobile terminal, when the transport service providing means is available for providing the transport service.

The mobile terminal further includes a display unit, which displays at least a part of the received information regarding the transport service providing means.

According to another aspect of the present invention, there is provided a transport service managing server including a reception unit, which receives information regarding a user and information regarding a transport service preferred by the user from a mobile terminal, for the user's use of the transport service; an extraction unit, which extracts a transport service providing means corresponding to the information regarding the transport service preferred by the user; a transmission unit, which transmits information regarding the transport service providing means to the mobile terminal and transmits service request information including information regarding the user to the transport service providing means; and a control unit, which controls the reception unit, the extraction unit, and the transmission unit, wherein the information regarding the transport service providing means is information for confirming the user's use of the transport service.

According to another aspect of the present invention, there is provided a transport service providing vehicle including a reception unit, which receives, from a transport service managing server, a service request information including information regarding a user who wants to use a transport service; a transmission unit, which transmits information for confirming the user's use of the transport service to a mobile terminal of the user via a short-range wireless communication, when the transport service providing vehicle is available for providing transport service to the user; and a control unit, which controls the reception unit and the transmission unit, wherein the information for confirming the user's use of the transport service includes at least one from between information regarding the transport service providing vehicle and information regarding a driver thereof.

According to another aspect of the present invention, there is provided a computer readable recording medium having recorded thereon a computer program for implementing the method of claim 1.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIGS. 8A and 8B are diagrams showing information regarding transport service providing means according to an embodiment of the present invention;

FIG. 10 is a diagram for describing a method of paying transport service fare according to an embodiment of the present invention;

FIGS. 11A and 11B are diagrams showing a transport service fare payment screen on a mobile terminal according to an embodiment of the present invention;

DETAILED DESCRIPTION

Figure 1:
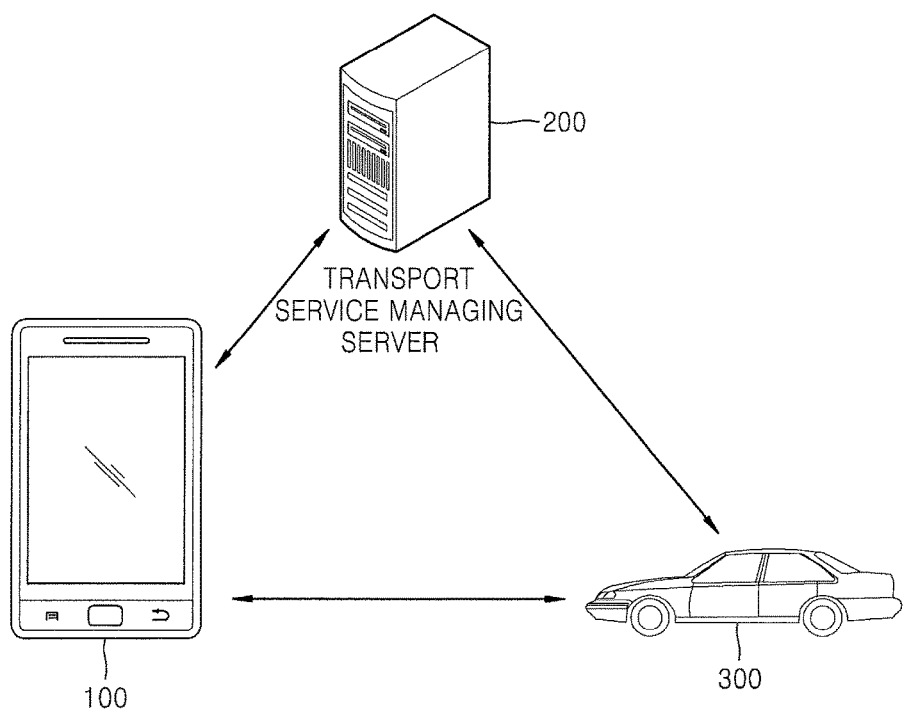
FIG. 1 is a block diagram showing a transport service providing system according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

As used herein, the term "and/or" includes any and all combinations of one or more of the associated listed items.

Terms used in the present invention will be briefly described below, and then detailed descriptions thereof will be given below.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, terms including "~ unit" or "~ module" in the specification refers to a unit for processing at least one function or operation and may be embodied in hardware, software, or a combination thereof.

Throughout the specification, the term "transport service" refers to a service for physically relocating a user. Throughout the specification, the term "user" refers to a person who desires to use a transport service and a possessor of a mobile terminal.

Also throughout the specification, the term "transport service providing means" refers to one or more transport service providers, such as a transport service providing vehicle.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like numbers refer to like elements throughout.

FIG. 1 is a block diagram showing a transport service providing system according to an embodiment of the present invention.

As shown in FIG. 1, the transport service providing system according to an embodiment of the present invention may include a mobile terminal 100, a transport service managing server 200, and a transport service providing vehicle 300. The transport service providing vehicle 300 may be referred to as a transport service providing means (or one or more transport service providers) according to embodiments. However, not all of the components shown in FIG. 1 are necessary components. A transport service providing system may include more or less components than the components shown in FIG. 1.

Detailed descriptions thereof will be given below.

The mobile terminal 100 refers to a device capable of providing transport service information to a user. The mobile terminal 100 may be embodied in various forms. For example, the mobile terminal 100 may be a mobile phone, a smart phone, a laptop computer, a tablet PC, an e-book terminal, a personal digital assistant (PDA), a portable multimedia player (PMP), a navigation device, a MP3 player, a camera, etc.

The mobile terminal 100 may communicate with the transport service managing server 200 and the transport service providing vehicle 300 via a network. According to an embodiment of the present invention, the network may be embodied with wireless communication technologies, such as near-field communication (NFC), wireless fidelity (Wi-Fi), BLUETOOTH, HR WPAN, ultra wideband (UWB), LR WPAN, and IEEE1394.

The mobile terminal 100 according to an embodiment of the present invention may transmit information regarding a user and transport service accessing condition information to the transport service managing server 200. The transport service accessing condition information may refer to information regarding a transport service preferred by a user. Furthermore, the mobile terminal 100 may perform confirmation with respect to the transport service providing vehicle 300 via a short-range wireless communication.

Meanwhile, the mobile terminal 100 may include a security region. Examples of the security region may include a subscriber identify module (SIM) and universal SIM (USIM). The mobile terminal 100 may store a mobile card in the security region. A mobile card is a card embodied on the mobile terminal 100 in the form of software. A mobile card may be issued to the mobile terminal 100 via a wireless network.

Furthermore, the mobile terminal 100 may store other payment information of a user other than a mobile card. For example, the mobile terminal 100 may store information for an account wire-transfer (e.g., bank of an account, an account number, an account holder's name), account information used for payment (e.g., an ID for making a payment, an e-mail for making a payment).

The transport service managing server 200 refers to a server which manages information related to a transport service providing means. The transport service managing server 200 may communicate with the mobile terminal 100 and the transport service providing vehicle 300.

For example, the transport service managing server 200 may transmits information regarding the transport service providing vehicle 300 to the mobile terminal 100 and may transmit service request information including information regarding a user of the mobile terminal 100 to the transport service providing vehicle 300.

Furthermore, the transport service managing server 200 may receive information regarding origin of departure, time of departure, destination, and time of arrival from the mobile terminal 100 or the transport service providing vehicle 300 and may provide information regarding transport service fare to the mobile terminal 100 or the transport service providing vehicle 300.

The transport service providing vehicle 300 refers to a means of transportation capable of providing transport service to a user. The transport service providing vehicle 300 according to an embodiment of the present invention may vary. For example, the transport service providing vehicle 300 may include small vehicles, mid-size vehicles, large vehicles, 2-wheeled vehicles, and special vehicles. In other words, the transport service providing vehicle 300 may include passenger vehicles, utility vehicles, trucks, taxis, buses, and freight vehicles.

The transport service providing vehicle 300 may perform a short-range wireless communication (e.g., NFC, BLUETOOTH, UWB, ZIGBEE, WFD, etc.) with the mobile terminal 100. Particularly, the transport service providing vehicle 300 may record information regarding a vehicle and information regarding a user in a close-distance wireless communication tag.

The transport service providing vehicle 300 may communicate with the transport service managing server 200 via a network. The transport service providing vehicle 300 may receive information regarding a user of the mobile terminal 100 from the transport service managing server 200 and may also receive information regarding transport service fare for the user from the transport service managing server 200.

Meanwhile, the transport service providing vehicle 300 may confirm a user who wants to use transport service based on information regarding the user received from the mobile terminal 100 and information regarding the user received from the transport service managing server 200.

Hereinafter, a method by which the mobile terminal 100 provides transport service information to a user and confirm the user's use of the transport service will be described in detail with reference to FIG. 2.

Figure 2:
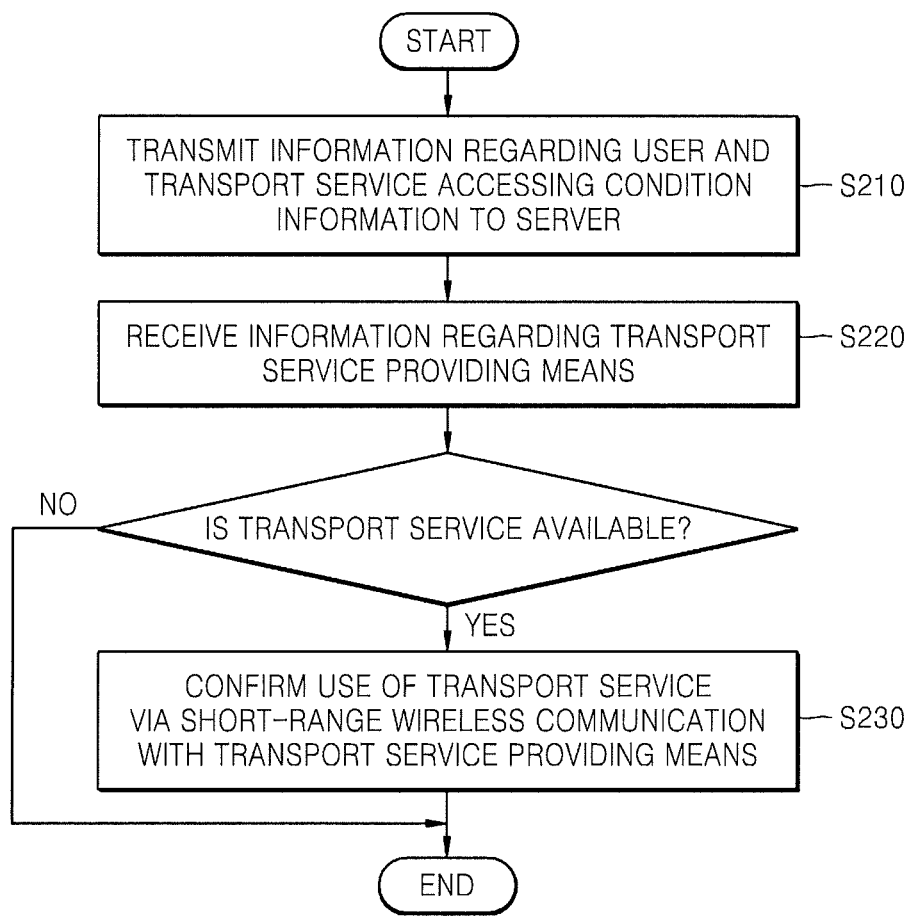
FIG. 2 is a flowchart showing a method of providing transport service information via a mobile terminal according to an embodiment of the present invention.

FIG. 2 is a flowchart showing a method of providing transport service information via a mobile terminal according to an embodiment of the present invention.

In an operation 210, the mobile terminal 100 may transmit information regarding a user and transport service accessing condition information to the transport service managing server 200. The information regarding a user according to an embodiment of the present invention may include at least one of identification of the user (e.g., name, ID, nickname, etc.), contact information of the user, and information regarding a location of the user.

The transport service accessing condition information refers to information regarding transport services desired by a user. For example, the transport service accessing condition information may include at least one of condition information regarding vehicles, condition information regarding a driver, information regarding an origin of departure, information regarding a destination, and information regarding payment methods.

The condition information regarding a vehicle according to an embodiment of the present invention may include at least one of information regarding type of the vehicle (e.g., model of the vehicle, manufacturer of the vehicle, normal taxi/limousine taxi, vehicle for rental), information regarding color of the vehicle, information regarding additional equipment on the vehicle (e.g., a navigation device, a sunroof, a BLUETOOTH device, a wiper de-icer, a rear-view camera, a black box, etc), information regarding out-of-factory date of the vehicle, information regarding accident history of the vehicle, information regarding total mileage of the vehicle, and information regarding terms the vehicle was rented for.

The condition information regarding a driver according to an embodiment of the present invention may include information regarding at least one of gender, age, driving experience, and user evaluation of the driver.

The payment methods according to an embodiment of the present invention may include at least one of credit cards, debit cards, account wire-transfers, negotiable securities, coupons, and account-based payment methods. Furthermore, the payment method may not only include a magnetic plate type card, but also include a mobile card and a virtual card that are stored in a secured region of the mobile terminal 100 in the form of software. The account-based payment methods refer to a user account linked with a credit card or a bank account, so that the user account becomes a method of payment.

In an operation 220, the mobile terminal 100 may receive information regarding transport service providing means in correspondence to the transport service accessing condition information from the transport service managing server 200.

The information regarding transport service providing means may include at least one of information regarding identification of a vehicle (e.g., a vehicle number, a vehicle image), information regarding current location of the vehicle, information regarding time of arrival of the vehicle, information regarding a driver (e.g., information regarding gender, age, and driving experience of the driver), information regarding user evaluation, information regarding authentication (e.g., an one-time authentication code), and estimated amount for payment.

In other words, the mobile terminal 100 may receive information regarding a transport service providing means corresponding to conditions input by a user from the transport service managing server 200.

In an operation 230, when a user is able to access transport service by a transport service providing means, the mobile terminal 100 may confirm the user's access of the transport service via a short-range wireless communication with the transport service providing means. According to an embodiment of the present invention, a user is able to access transport service by a transport service providing means when the transport service providing means is within a communicable range from the mobile terminal 100.

In other words, according to an embodiment of the present invention, the mobile terminal 100 may confirm an access to a transport service based on information acquired via a short-range wireless communication with a transport service providing means and information regarding the transport service providing means received from the transport service managing server 200.

According to an embodiment of the present invention, when a user contacts the mobile terminal 100 to a transport service providing means, the mobile terminal 100 may acquire information for confirming an access to a transport service from the transport service providing means via a NFC.

The information acquired from a transport service providing means according to an embodiment of the present invention may include an identification of the vehicle (e.g., a vehicle number), information regarding a driver (e.g., gender, age, and driving experience of the driver), and authentication information (e.g., an one-time authentication code).

According to another embodiment of the present invention, the mobile terminal 100 may acquire information for confirming an access to a transport service from a transport service providing means via BLUETOOTH, Wi-Fi, ZIG-BEE, WFD, etc.

According to another embodiment of the present invention, the mobile terminal 100 may acquire information for confirming an access to a transport service from a barcode, a color code, or the like attached to a transport service providing means. The barcode may include not only 1-dimensional (1D) barcode, but also 2-dimensional (2D) barcode. An example of 2D barcodes includes a quick response (QR) code.

According to an embodiment of the present invention, the mobile terminal 100 may determine whether information acquired from a transport service providing means via a short-range wireless communication is identical to information regarding the transport service providing means that is received from the transport service managing server 200. In other words, when a user is able to access a transport service via a transport service providing means, the mobile terminal 100 may confirm whether an available transport service providing means is the transport service providing means requested to the transport service managing server 200 by a user.

For example, the mobile terminal 100 may compare information regarding a vehicle or information regarding a driver received from the transport service managing server 200 in correspondence to transport service accessing condition information to information regarding a vehicle or information regarding a driver received from a transport service providing means via a short-range wireless communication. According to another embodiment of the present invention, the mobile terminal 100 may determine whether first authentication information (e.g., an authentication code) received from the transport service managing server 200 is identical to second authentication information acquired from a transport service providing means.

If information acquired from a transport service providing means via a short-range wireless communication is identical to information regarding a transport service providing means received from the transport service managing server 200 by a predetermined percentage or higher percentage (e.g., 99%), confirmation of a user for accessing a transport service may be successful.

In other words, according to an embodiment of the present invention, the mobile terminal 100 may provide a safe transport service to a user via a confirmation with a transport service providing means.

Hereinafter, methods by which the mobile terminal 100 provides transport service information and confirms a transport service will be described in closer detail with reference to FIG. 3.

Figure 3:
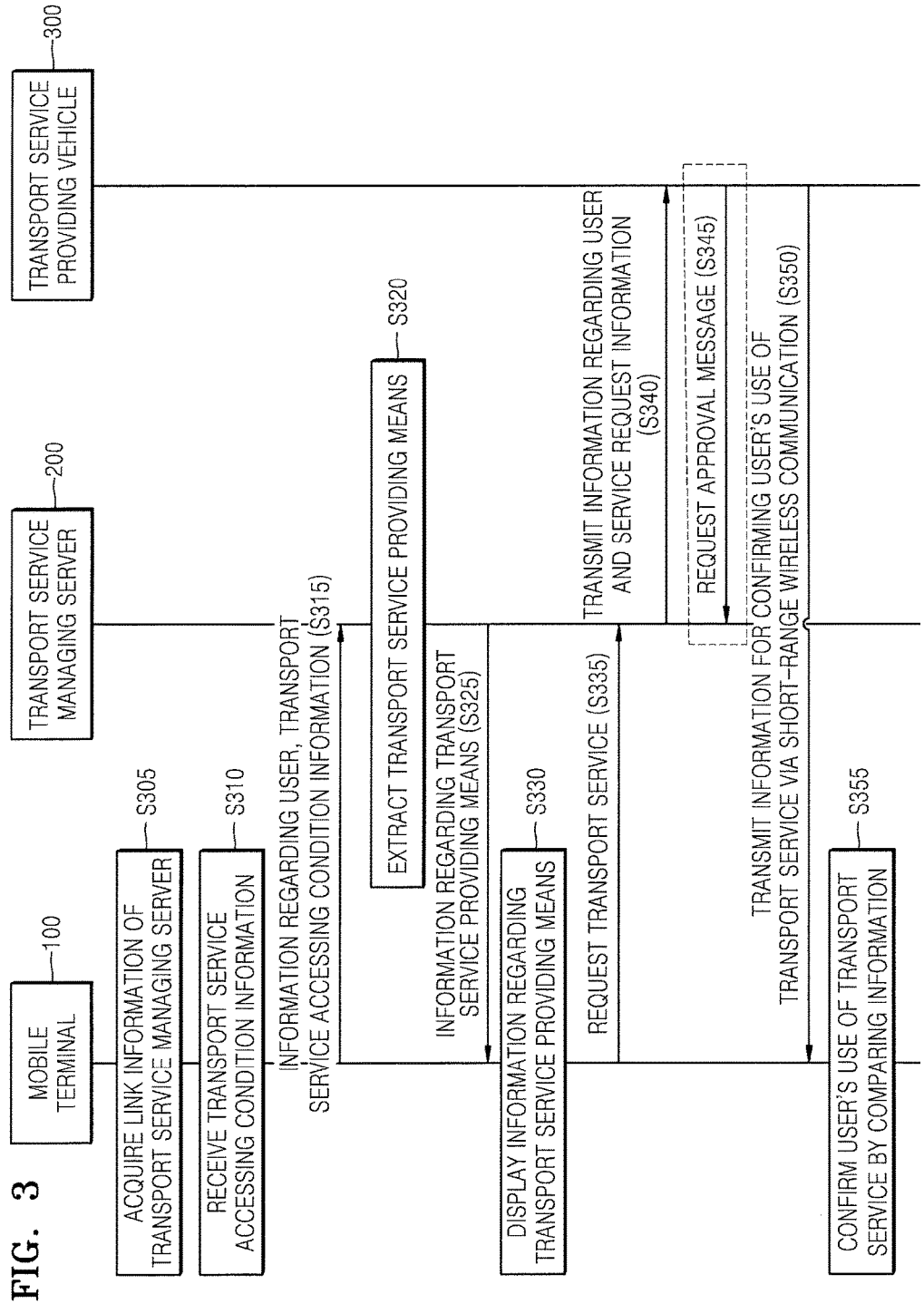
FIG. 3 is a flowchart showing a transport service providing system according to an embodiment of the present invention.

FIG. 3 is a flowchart showing a transport service providing system according to an embodiment of the present invention.

In an operation 305, the mobile terminal 100 may acquire link information for communicating with the transport service managing server 200. An example of the link information may be a uniform resource locator (URL).

According to an embodiment of the present invention, the mobile terminal 100 may acquire link information via a short-range wireless communication. For example, if a user contacts the mobile terminal 100 to a NFC tag attached to a boarding platform, the mobile terminal 100 may receive link information of the transport service managing server 200 stored in the NFC tag. Furthermore, the mobile terminal 100 may receive link information of the transport service managing server 200 from an external device (e.g., a kiosk) via a communication protocol, such as BLUETOOTH, WFD, Wi-Fi, and UWB.

According to an embodiment of the present invention, the mobile terminal 100 may receive link information of the transport service managing server 200 from a barcode. The barcode may include not only a 1D barcode, but also a 2D barcode (e.g., a QR code) and a 3-dimensional (3D) barcode. For example, the mobile terminal 100 may recognize a QR code, which is attached to a boarding platform and includes link information of the transport service managing server 200, via a camera and acquire the link information of the transport service managing server 200.

According to an embodiment of the present invention, the mobile terminal 100 may acquire link information via an application. For example, when mobile terminal 100 downloads and executes a predetermined application, the predetermined application may acquire link information of the transport service managing server 200 corresponding to a corresponding location based on information regarding a location of the mobile terminal 100 (e.g., GPS information). Here, the mobile terminal 100 may directly access the transport service managing server 200 via the predetermined application.

In an operation 310, the mobile terminal 100 may receive a user input for transport service accessing condition information. For example, the mobile terminal 100 may receive inputs related to information regarding conditions for a vehicle, information regarding conditions for a driver, information regarding origin of departure, information regarding destination, and information regarding payment methods from a user. Detailed descriptions thereof will be given below with reference to FIG. 4.

Figure 4:
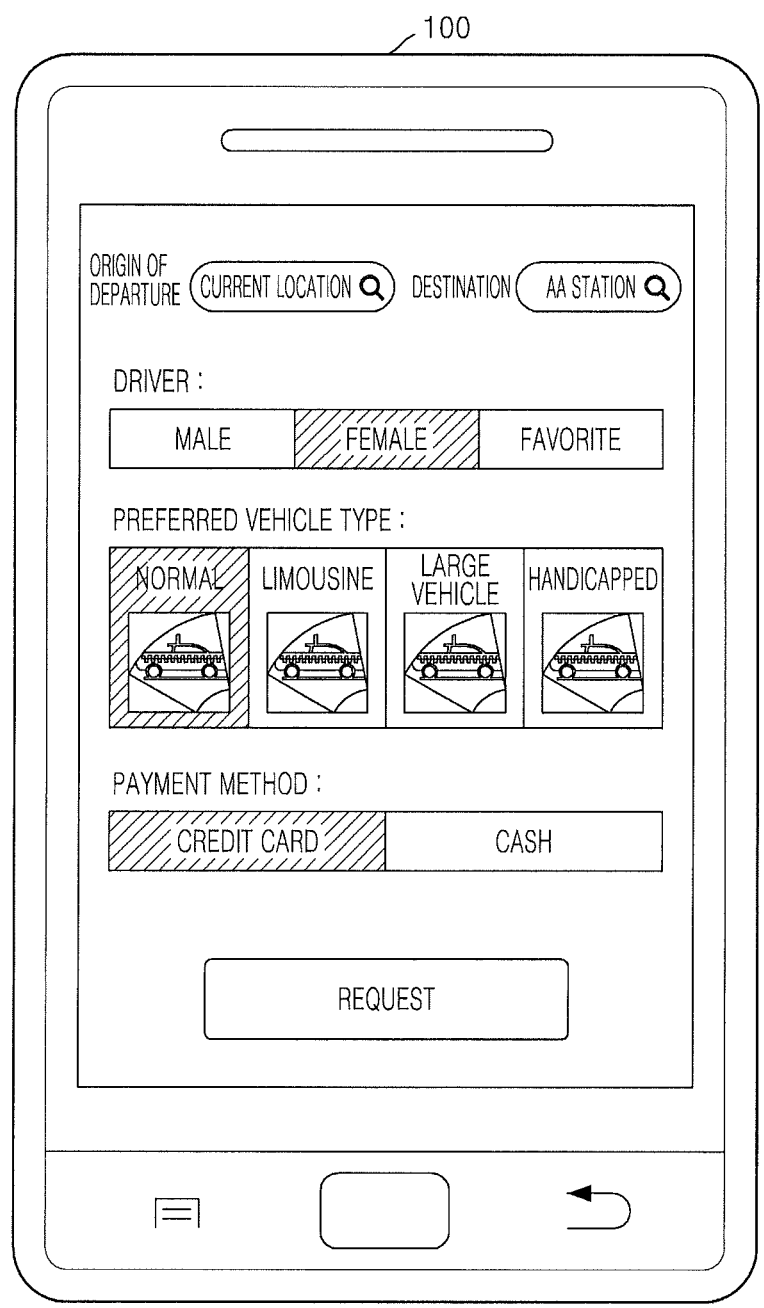
FIG. 4 shows a screen image for receiving input of transport service accessing condition information, according to an embodiment of the present invention.

FIG. 4 shows a screen image for receiving input of transport service accessing condition information, according to an embodiment of the present invention.

As shown in FIG. 4, a user may select 'female' for gender of a driver, 'normal taxi' for a preferred vehicle type, and 'credit card' for a payment method. Furthermore, the user may search for and input an origin of departure and a destination. Here, the mobile terminal 100 may automatically input a current location of the mobile terminal 100 as the origin of departure of the user.

Furthermore, although not shown in FIG. 4, a user may input detailed information regarding a driver and a vehicle. For example, the user may further select '10 or more years' for driving experience of a driver, 'AA model' for a vehicle, and 'Korean and Japanese' for language proficiency of the driver.

Referring back to FIG. 3, In an operation 315, the mobile terminal 100 may request information regarding a transport service providing means while transmitting information regarding a user and transport service accessing condition information to the transport service managing server 200.

In an operation 320, the transport service managing server 200 may extract a transport service providing means corresponding to the transport service accessing condition information. According to an embodiment of the present invention, the transport service managing server 200 may extract one transport service providing means corresponding to transport service accessing conditions the most.

If there are a plurality of transport service providing means corresponding to transport service accessing condition, the transport service managing server 200 may extract one transport service providing means based on user evaluations. In other words, the transport service managing server 200 may extract a transport service providing means with the most favourable user evaluations of a plurality of a plurality of transport service providing means satisfying the transport service accessing conditions.

Furthermore, the transport service managing server 200 may extract the closest transport service providing means from the mobile terminal 100 of a plurality of transport service providing means satisfying the transport service accessing conditions.

Meanwhile, the transport service managing server 200 may transmit a list of a plurality of transport service providing means to the mobile terminal 100 and may extract at least one transport service providing means based on a user selection. Detailed descriptions thereof will be given below with reference to FIG. 5.

In an operation 325, the mobile terminal 100 may receive information regarding transport service providing means. Next, In an operation 330, the mobile terminal 100 may display at least a part of the information regarding transport service providing means in a screen image. For example, the mobile terminal 100 may display a vehicle image, a vehicle number, a driver image, and user evaluations.

After a user checks information regarding transport service providing means, the user may decide whether to receive a transport service via the transport service providing means extracted from the transport service managing server 200.

In an operation 335, if the user decides to receive a transport service via the transport service providing means extracted from the transport service managing server 200, the transport service managing server 200 may transmit a transport service request to the transport service managing server 200.

In an operation 340, the transport service managing server 200 may transmit service request information including information regarding the user to the transport service providing vehicle 300. The information regarding the user may include the user's image, the user's name, the user's contact information, and information regarding a location of the user.

In an operation 345, the transport service managing server 200 may receive an approval message regarding the service request from the transport service providing vehicle 300. If the transport service managing server 200 receives a decline message regarding the service request from the transport service providing vehicle 300, the transport service managing server 200 may extract a new transport service providing means corresponding to the transport service accessing condition information and transmit information regarding the newly extracted transport service providing means to the mobile terminal 100.

The transport service providing vehicle 300 which has approved the service request may move to a current location of the user or an origin of departure designated by the user.

In an operation 350, the transport service providing vehicle 300 may transmit information for confirming a user's access to a transport service to the mobile terminal 100 via a short-range wireless communication, when the user is able to access transport service by the transport service providing vehicle 300.

In other words, when the transport service providing means (e.g., a taxi) is within a communicable range of the mobile terminal 100, the transport service providing vehicle 300 may transmit information for confirming a user's access to a transport service to the mobile terminal 100 via a short-range wireless communication In an operation 355, the mobile terminal 100 may confirm the access to a transport service by comparing information. In other words, the mobile terminal 100 may confirm whether a transport service providing means via which the user decided to receive transport service is actually provided by determining whether information acquired from the transport service providing vehicle 300 via a short-range wireless communication and the information regarding transport service providing means received from the transport service managing server 200. Since the operation 355 corresponds to the operation 230 of FIG. 2, detailed descriptions thereof will be omitted.

According to embodiments of the present invention, the operations 305 through 355 of FIG. 3 may be performed in different sequences, and some of the operations 305 through 355 may be omitted.

Figure 5:
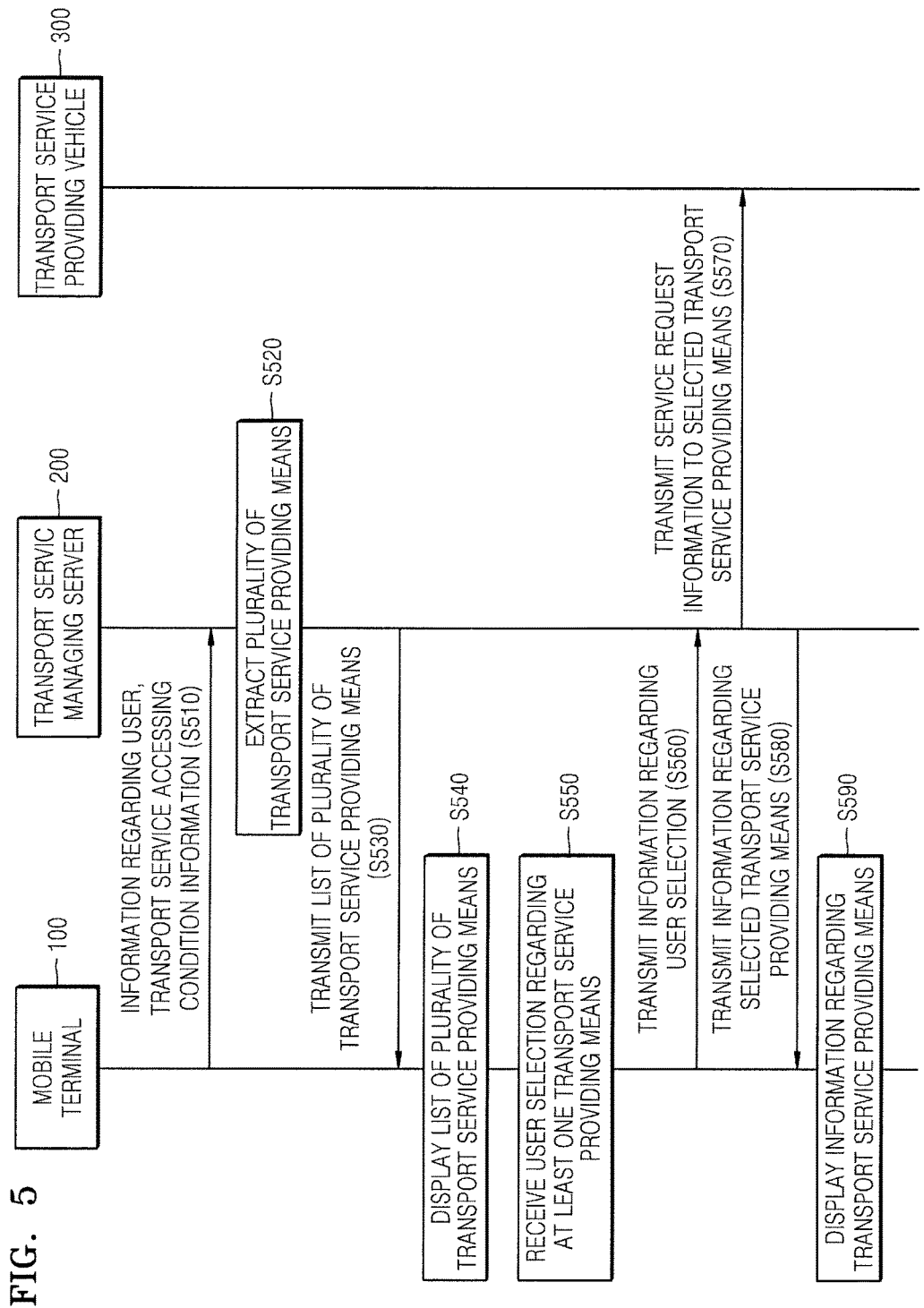
FIG. 5 is a flowchart for describing a method of providing a list of a plurality of transport service providing means according to an embodiment of the present invention.

FIG. 5 is a flowchart for describing a method of providing a list of a plurality of transport service providing means according to an embodiment of the present invention.

In an operation 510, the transport service managing server 200 may receive information regarding a user and transport service accessing condition information from the mobile terminal 100.

Here, in an operation 520, the transport service managing server 200 may extract a plurality of transport service providing means satisfying transport service accessing conditions. The less the transport service accessing conditions are desired by a user, the more the transport service providing means may be extracted. Meanwhile, the plurality of transport service providing means extracted by the transport service managing server 200 may be currently available for providing transport service. Therefore, according to an embodiment of the present invention, the transport service managing server 200 may confirm whether the plurality of transport service providing means are currently available for providing transport service before extraction of a transport service providing means.

In an operation 530, the transport service managing server 200 may transmit a list of the plurality of extracted transport service providing means to the mobile terminal 100. The list of the plurality of transport service providing means may include at least one of a vehicle identification, a current location, a wait time, a driver identification and user evaluations with respect to each of plurality of vehicles corresponding to the transport service accessing condition information.

In an operation 540, the mobile terminal 100 may display a list of the plurality of transport service providing means in a screen image. Here, according to an embodiment of the present invention, the mobile terminal 100 may display the plurality of transport service providing means from the transport service providing means with the most favourable user evaluations. Furthermore, the mobile terminal 100 may display the plurality of transport service providing means from the transport service providing means with the shortest wait time. Meanwhile, the mobile terminal 100 may recommend a particular transport service providing means based on user evaluations or estimated wait time.

Detailed descriptions thereof will be given below with reference to FIG. 6.

Figure 6:
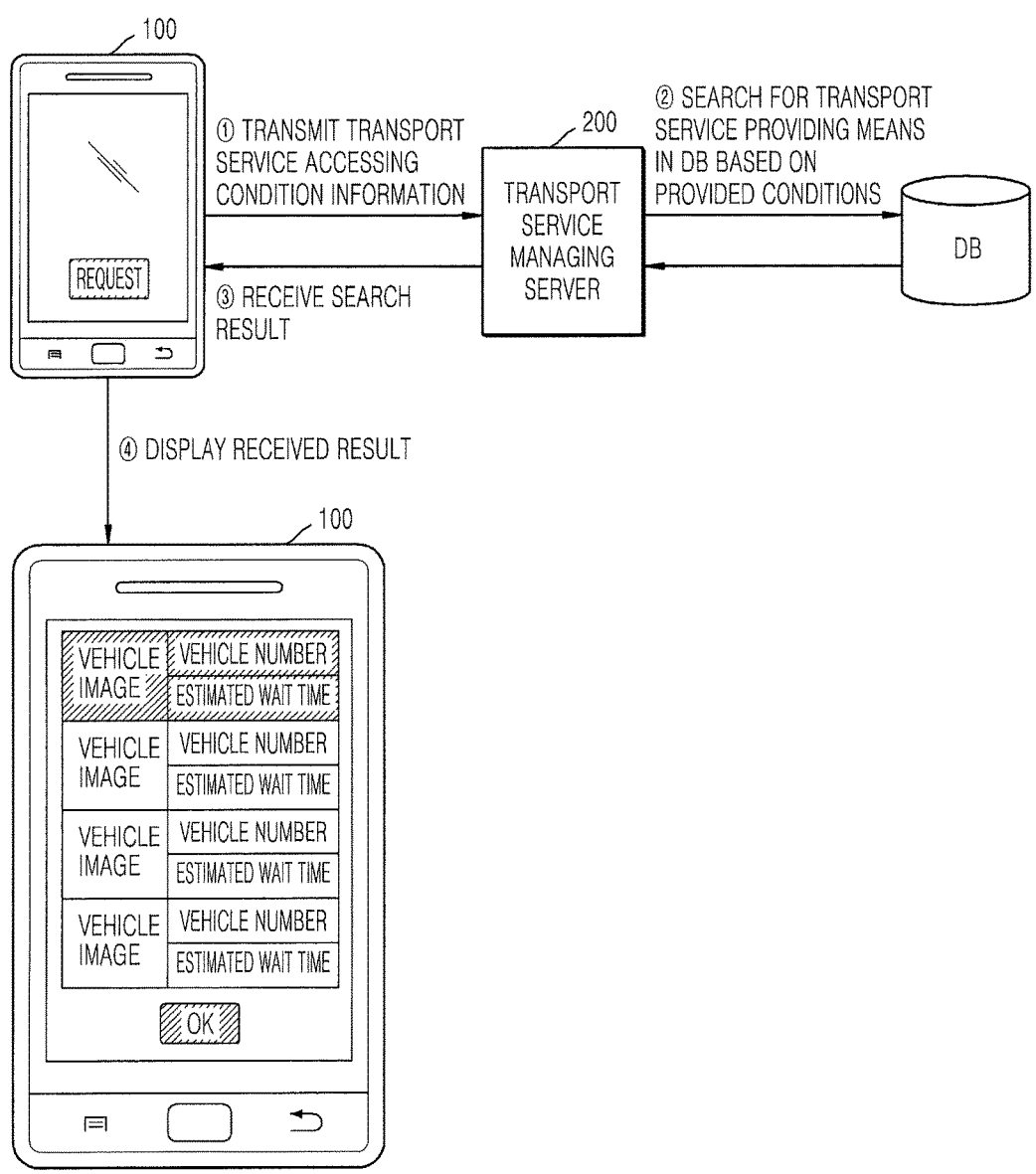
FIG. 6 is a diagram showing a list of a plurality of transport service providing means according to an embodiment of the present invention.

FIG. 6 is a diagram showing a list of a plurality of transport service providing means according to an embodiment of the present invention.

As shown in FIG. 6, when a user inputs transport service accessing condition information including 'driver: female, driving experience: 10 or more years, preferred type of vehicle: XXX, payment method: credit card, origin of departure: OO Park, destination: OO department store' for a taxi, the transport service managing server 200 may extract a list of taxis which are XXX, are driven by female drivers having 10 or more years of driving experiences, accepts credit cards for payment, and are within a predetermined distance from the OO park.

Next, the mobile terminal 100 may receive the list of taxis extracted by the transport service managing server 200 and display the list in a screen image. The list of taxis may display information including vehicle images, vehicle numbers, estimated wait times, and user evaluations (preferences).

In an operation 550, the transport service managing server 200 may receive a user selection regarding at least on transport service providing means from the list of the plurality of transport service providing means. In other words, a user may confirm the list of the plurality of transport service providing means and may select a transport service providing means via which the user desires to receive transport service. Detailed descriptions thereof will be given below with reference to FIG. 7.

Figure 7A:
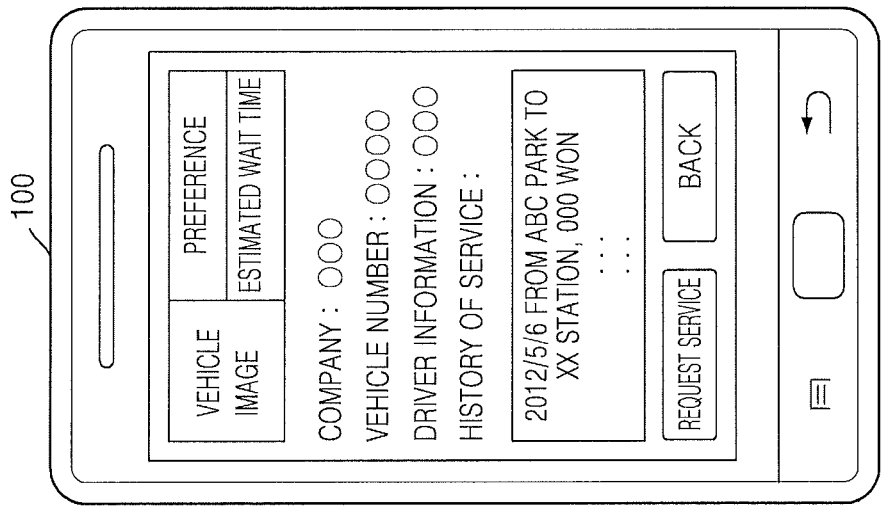
FIGS. 7A and 7B are diagrams showing a screen image for receiving a user selection regarding a transport service providing means, according to an embodiment of the present invention.
Figure 7B:
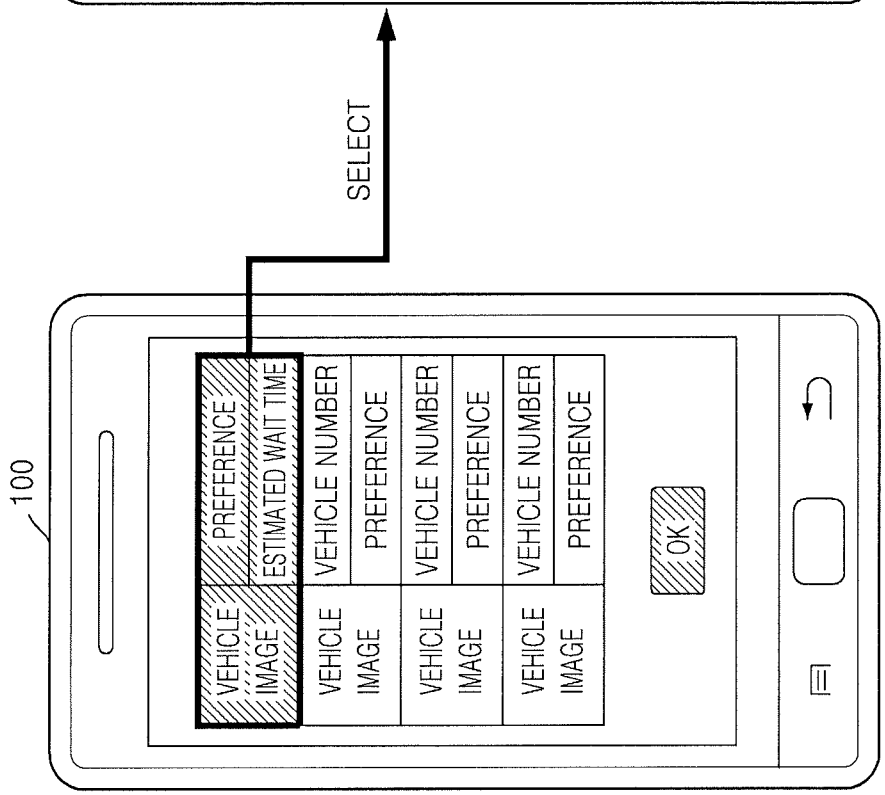

FIG. 7 is a diagram showing a screen image for receiving a user selection regarding a transport service providing means, according to an embodiment of the present invention.

As shown in FIG. 7(*a*), a user may select at least one transport service providing means from a list of a plurality of transport service providing means. Here, as shown in FIG. 7(*b*), the mobile terminal 100 may display detailed information regarding a particular transport service providing means when a user selects the particular transport service providing means. For example, the mobile terminal 100 may display brief information including vehicle images, preferences, and estimated wait times in a list of a plurality of transport service providing means (e.g., a taxi list), and, if a user selects a particular taxi from the list of the plurality of transport service providing means, the mobile terminal 100 may display more detailed information including company information, vehicle number, driver information, and history of services regarding the corresponding taxi.

In an operation 560, the mobile terminal 100 may transmit user selection information regarding the transport service providing means to the transport service managing server 200.

In an operation 570, the transport service managing server 200 may transmit service request information including user information to the particular transport service providing means selected by the user. If the user selected a plurality of transport service providing means, the transport service managing server 200 may transmit service request information to at least one of the plurality of transport service providing means selected by the user.

In an operation 580, the transport service managing server 200 may transmit information regarding transport service providing means selected by the user to the mobile terminal 100. In an operation 590, the mobile terminal 100 may display the information regarding transport service providing means selected by the user in a screen image. Detailed descriptions thereof will be given below with reference to FIG. 8.

FIG. 8 is a diagram showing information regarding transport service providing means according to an embodiment of the present invention.

As shown in FIG. 8(a), the mobile terminal 100 may display information including vehicle images, preferences, estimated wait time, company name, vehicle number, driver information, etc. regarding a transport service providing means selected by a user. Furthermore, the mobile terminal 100 may further display a history of services regarding the transport service providing means. The history of services refers to information regarding a history that the user has previously used the corresponding transport service providing means. For example, the history of services may include a time of service (May 6, 2012), a route (from ABC park to XX station), and a fare (5,000 Won).

As shown in FIG. 8(b), the mobile terminal 100 may display information regarding location of a transport service providing means. For example, the mobile terminal 100 may display a current location, a moving direction, and an origin of departure of the corresponding transport service providing means on a map.

Hereinafter, detailed descriptions regarding a process that a user confirms use of a transport service when a transport service providing means selected by the user arrives at a location of the user will be given below with reference to FIG. 9.

FIG. 9 is a diagram for describing a method of confirming a user's use of transport service via a short-range wireless communication, according to an embodiment of the present invention.

Figure 9A:
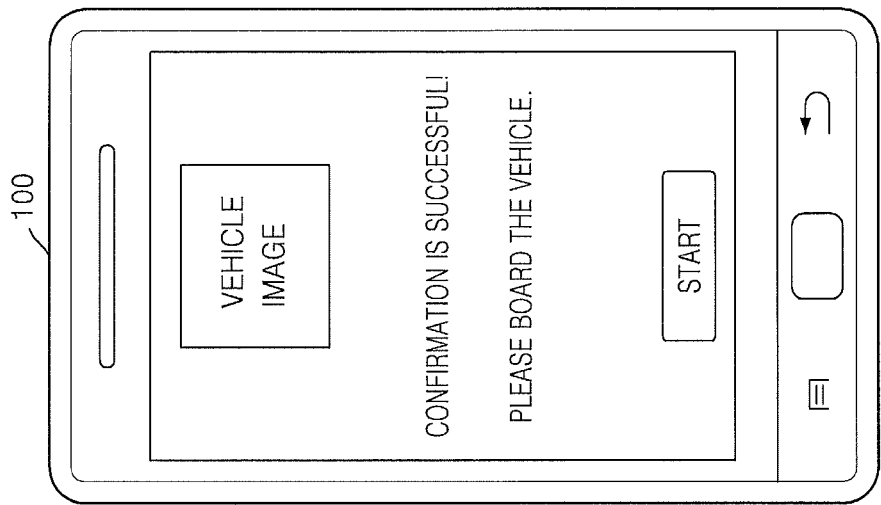
FIGS. 9A, 9B, and 9C are diagrams for describing a method of confirming a user's use of transport service via a short-range wireless communication, according to an embodiment of the present invention.

As shown in FIG. 9(a), when the transport service providing vehicle 300 is within a predetermined distance from the mobile terminal 100, the mobile terminal 100 may display a message notifying arrival of the transport service providing vehicle 300 in a screen image. For example, the mobile terminal 100 may display a message saying "The requested transport service providing vehicle 300 is almost there. Please contact the mobile terminal 100 to a NFC device of the transport service providing vehicle 300."

Figure 9B:
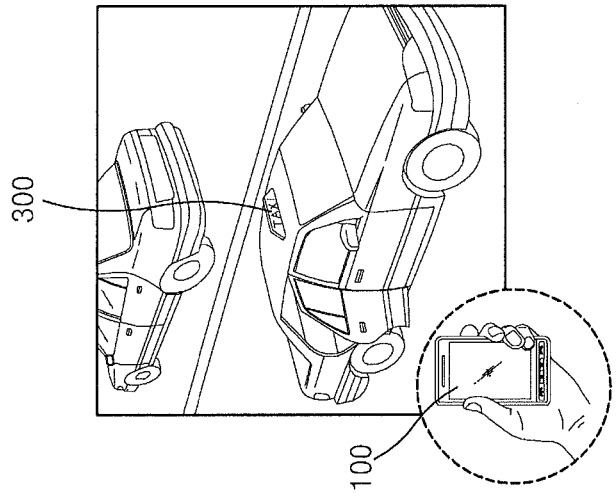

In this case, as shown in FIG. 9(b), a user may contact the mobile terminal 100 to the NFC device of the transport service providing vehicle 300. In this case, the mobile terminal 100 may acquire information stored in the NFC device from the transport service providing vehicle 300 via short-range wireless communication. The mobile terminal 100 compares information acquired from the transport service providing vehicle 300 and the information regarding transport service providing means received from the transport service managing server 200 and confirms the user's use of transport service.

For example, if an AAA taxi satisfying transport service accessing conditions (driver: female, driving experience: 10 or more years, preferred type of vehicle: XXX, payment method: credit card, origin of departure: OO Park, destination: OO department store) input by a user and transmits information regarding the AAA taxi, the mobile terminal 100 may confirm whether a taxi arrived at a location of the user is the AAA taxi requested by the user.

The mobile terminal 100 compares information regarding the AAA taxi (e.g., driver name: OOO, gender: female, vehicle number: 1234, vehicle color: gray, company name: XXX, etc.) received from the transport service managing server 200 and information acquired via a short-range wireless communication from a taxi currently arrived at a location of the user (e.g., driver name: OOO, gender: female, vehicle number: 1234, vehicle color: gray, company name: XXX, etc.).

As a result, if the information regarding the AAA taxi is identical to the information acquired from the taxi currently arrived at a location of the user, it is very likely the taxi currently arrived at the location of the user is the AAA taxi. Therefore, the mobile terminal 100 successfully confirms the taxi currently arrived at the location of the user.

Figure 9C:
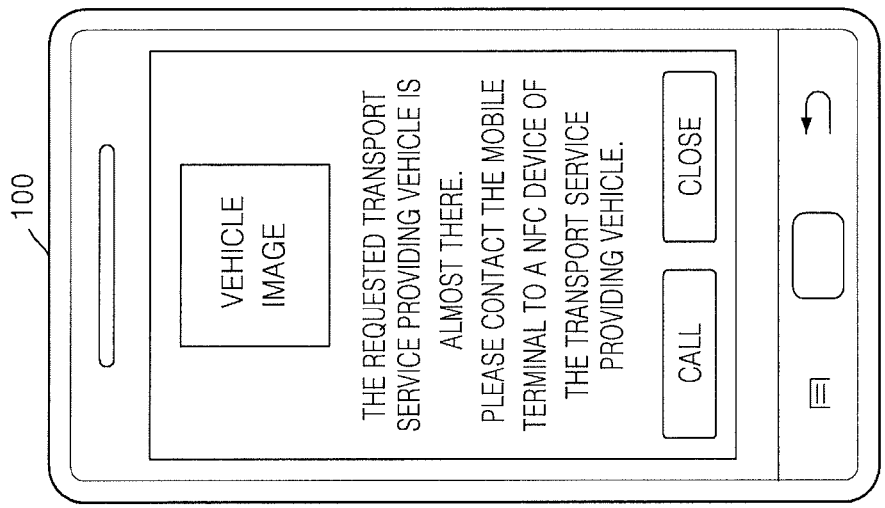

Therefore, as shown in FIG. 9(c), the mobile terminal 100 may display a message notifying a successful confirmation, such as "Confirmation is successful! Please board the vehicle."

Meanwhile, if the information regarding the AAA taxi is not identical to the information acquired from the taxi currently arrived at the location of the user, it is unlikely the taxi currently arrived at the location of the user is not the AAA taxi, and thus confirmation of the mobile terminal 100 on the taxi currently arrived at a location of the user is not successful.

In other words, according to an embodiment of the present invention, when the AAA taxi requested by the user for transport service, the user may easily confirm use of the transport service by contacting the mobile terminal 100 to the NFC device of the AAA taxi.

FIG. 10 is a diagram for describing a method of paying transport service fare according to an embodiment of the present invention.

In an operation 1010, the mobile terminal 100 may confirm a user's use of transport service. Here, the if information regarding transport service providing means received from the transport service managing server 200 is identical to information acquired from a transport service providing means, the confirmation is successful. Since the operation 1010 corresponds to the operation 230 of FIG. 2, detailed descriptions thereof will be omitted.

In an operations 1020 and 1030, if the confirmation is successful, the transport service managing server 200 may receive information regarding origin of departure and information regarding time of departure from the mobile terminal 100 or the transport service providing vehicle 300.

Furthermore, In an operation 1040, the transport service providing vehicle 300 provides transport service to the user of the mobile terminal 100 in response to a service request from the transport service managing server 200.

In an operation 1050, when the transport service providing vehicle 300 arrives at a destination of the user, the user may finish using the transport service. In an operation 1060, the transport service providing vehicle 300 may transmit information regarding a destination and information regarding time of arrival to the transport service managing server 200. Alternatively, the mobile terminal 100 may transmit information regarding a destination and information regarding time of arrival to the transport service managing server 200.

In an operation 1070, the transport service managing server 200 may calculate transport service fare of the user based on the information regarding an origin of departure, the information regarding time of departure, the information regarding a destination, and the information regarding time of arrival that are acquired from the mobile terminal 100 or the transport service providing vehicle 300. In other words, the transport service managing server 200 may calculate transport service fare based on a distance of travel a time of travel of the transport service providing vehicle 300.

In an operations 1080 and 1085, the transport service managing server 200 may transmit information regarding transport service fare to the mobile terminal 100 or the transport service providing vehicle 300.

In an operation 1090, the mobile terminal 100 may make payment for the transport service fare via a short-range wireless communication based on the information regarding transport service fare received from the transport service managing server 200.

Therefore, according to an embodiment of the present invention, unfair service fare forced by a driver or company policies of the transport service providing vehicle 300 may be eliminated. Detailed descriptions thereof will be given below with reference to FIG. 11.

FIG. 11 is a diagram showing a transport service fare payment screen on a mobile terminal according to an embodiment of the present invention.

As shown in FIG. 11(a), the mobile terminal 100 may receive information regarding transport service fare from the transport service managing server 200 and display the information in a screen image. For example, the mobile terminal 100 may display information regarding an amount for payment, an origin of departure, time of departure, a destination, time of arrival, total distance of travel, and total time of travel. Furthermore, the mobile terminal 100 may display information regarding a payment method selected by a user (e.g., type of payment method, a credit card image, a credit card name, discount information, etc.).

Meanwhile, when a user selects a mobile card payment via a short-range wireless communication as a payment method, the mobile terminal 100 may display a notification message saying "Please contact the mobile terminal 100 to a NFC device for payment."

As shown in FIG. 11(b), the user may make payment for transport service fare by contacting the mobile terminal 100 to the NFC device of the transport service providing vehicle 300. In other words, the mobile terminal 100 may transmit information regarding a mobile card to the transport service providing vehicle 300 via a short-range wireless communication. The information regarding a mobile card may include a card number, an expiration date, and a card validation code (CVC).

Meanwhile, although FIG. 11 shows an example of making payment via NFC, any of various other payment methods may be utilized. For example, the mobile terminal 100 may generate a payment context based on information regarding transport service fare and information regarding a payment method associated with the user received from the transport service managing server 200 and request payment by transmitting the generated payment context. The information regarding payment method may include, if the payment method is a credit card, a card number, an expiration date, and a CVC. If the payment method is an account wire transfer, the information regarding payment method may include a bank of an account, an account number, an account holder's name, etc. In other words, the mobile terminal 100 according to an embodiment of the present invention may directly make payment without the transport service providing vehicle 300.

Figure 12B:
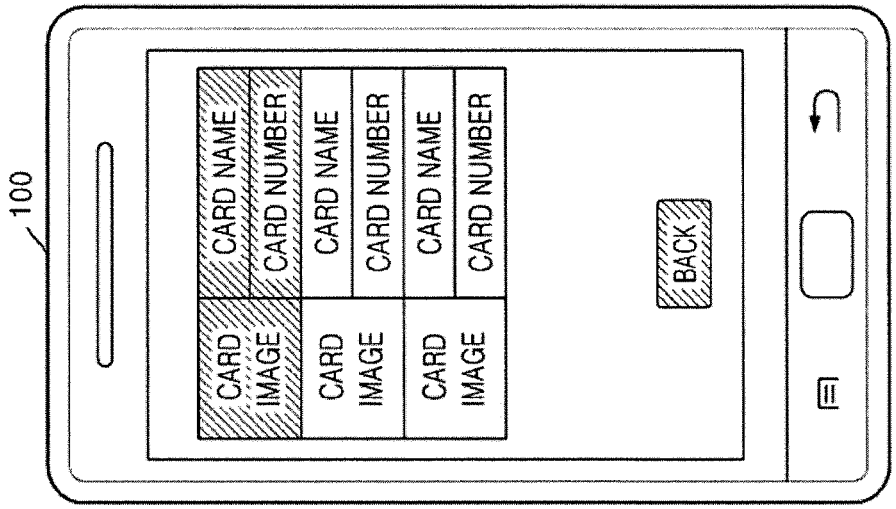
FIGS. 12A and 12B are diagrams showing a payment method changing screen image on a mobile terminal according to an embodiment of the present invention.
Figure 12A:
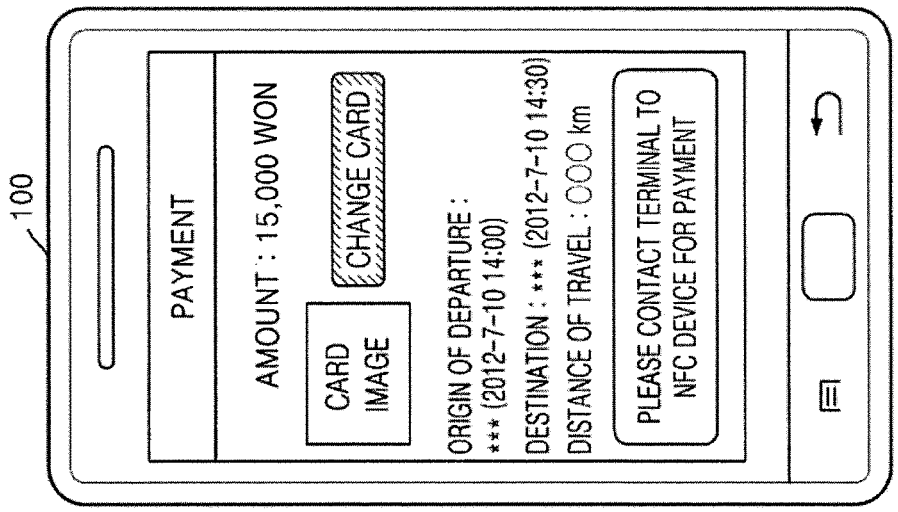

FIG. 12 is a diagram showing a payment method changing screen image on a mobile terminal according to an embodiment of the present invention.

The mobile terminal 100 may display a list of payment methods associated with a user via an electronic wallet application. The mobile terminal 100 may receive a user selection regarding at least one payment method from the list of payment methods. For example, the user may select a mobile card A, a gift card B, an account wire-transfer, or an account-based payment as a payment method. Here, the mobile terminal 100 may display information regarding a payment method selected by the user in a screen image.

Meanwhile, according to an embodiment of the present invention, mobile terminal 100 may receive a user selection regarding a plurality of payment methods. For example, a user may select a mobile card A and a mobile card B, such that an amount for payment is split-billed to the mobile card A and the mobile card B. Furthermore, a user may receive a discount by using a coupon OO and request confirmation of a payment for the remaining amount using the mobile card A. In this case, the user selects the coupon OO and the mobile card A.

Figure 13:
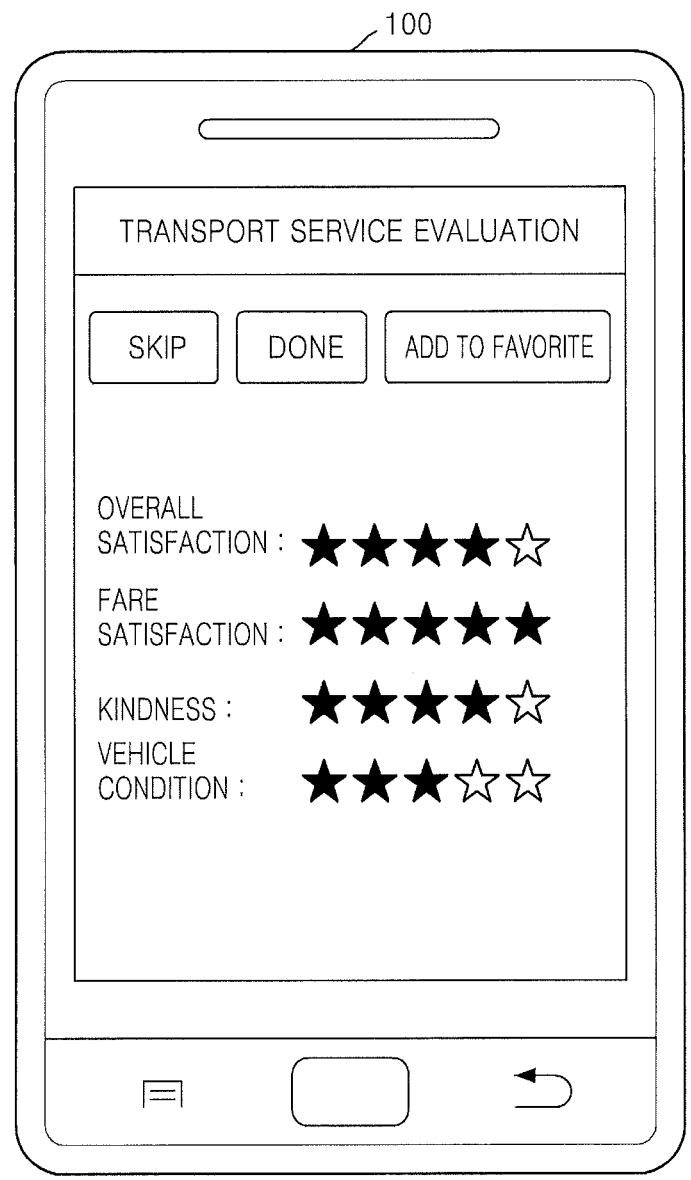
FIG. 13 is a diagram showing information regarding user evaluation on a transport service providing means according to an embodiment of the present invention.

FIG. 13 is a diagram showing information regarding user evaluation on a transport service providing means according to an embodiment of the present invention.

As shown in FIG. 13, after a user finishes using a transport service, the mobile terminal 100 may receive information regarding user evaluation on a transport service providing means. For example, the user may evaluate the overall satisfaction, fare satisfaction, kindness of a driver, and vehicle conditions regarding a transport service providing means. At this point, the mobile terminal 100 may transmit information regarding user evaluation on the transport service providing means to the transport service managing server 200.

Meanwhile, according to an embodiment of the present invention, after a user finishes using a transport service, the user may add a satisfactory transport service providing means to a favorite list. In other words, the mobile terminal 100 may add the transport service providing means to a favorite list based on a user input. According to an embodiment of the present invention, the mobile terminal 100 may transmit information regarding transport service providing means added to the favorite list to the transport service managing server 200.

Figures 14A, 14B:
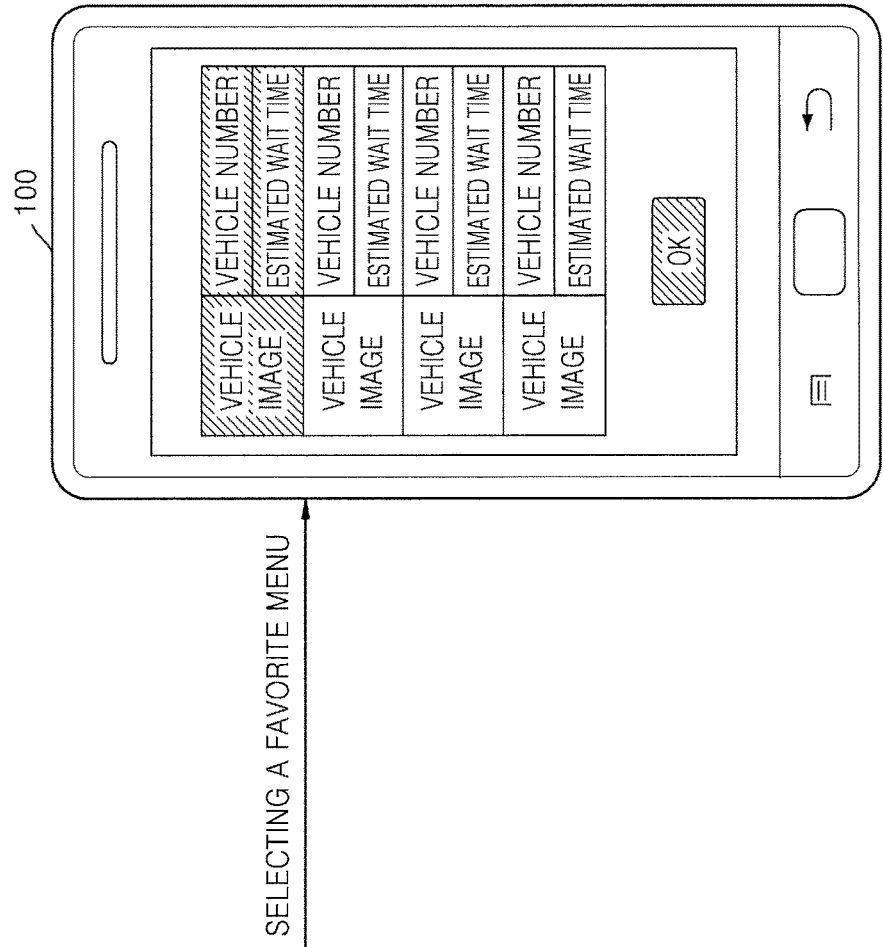
FIGS. 14A and 14B are diagrams showing a favorite list screen image according to an embodiment of the present invention.

FIG. 14 is a diagram showing a favorite list screen image according to an embodiment of the present invention.

As shown in FIG. 14, according to an embodiment of the present invention, a user may select a favorite menu when the user inputs transport service accessing condition information. In this case, the mobile terminal 100 may display a list of at least one transport service providing means added to the favorite menu. A list of at least one transport service providing means may include a vehicle image, a vehicle number, an estimated wait time, and history of services.

When a user selects at least one transport service providing means from the favorite menu, the mobile terminal 100 may transmit identification information regarding the selected transport service providing means to the transport service managing server 200. In this case, the transport service managing server 200 may request the transport service providing means selected by the user to provide transport service to the user.

Figure 15:
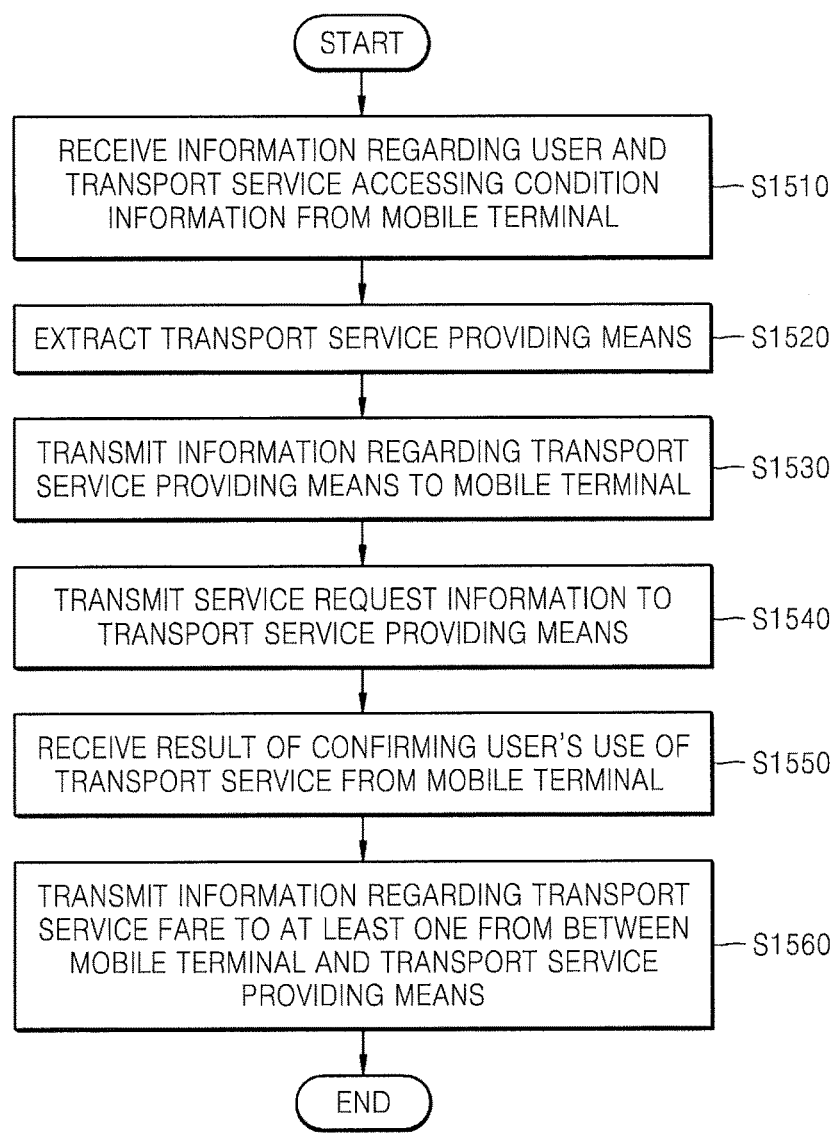
FIG. 15 is a flowchart for describing a method by which a transport service managing server manages transport services, according to an embodiment of the present invention.

FIG. 15 is a flowchart for describing a method by which a transport service managing server manages transport services, according to an embodiment of the present invention.

In an operation 1510, the transport service managing server 200 may receive user information and transport service accessing condition information from the mobile terminal 100 for providing a transport service to a user.

In an operation 1520, the transport service managing server 200 may extract a transport service providing means based on the transport service accessing condition information. In other words, the transport service managing server 200 may search for transport service providing means that satisfies transport service accessing conditions in a database.

According to an embodiment of the present invention, if a plurality of transport service providing means satisfying the transport service accessing conditions, the transport service managing server 200 may transmit a list of the plurality of transport service providing means to the mobile terminal 100. Next, the transport service managing server 200 may receive a user selection regarding at least one transport service providing means from the list of the plurality of transport service providing means from the mobile terminal 100.

In an operation 1530, the transport service managing server 200 may transmit information regarding transport service providing means to the mobile terminal 100. Here, the information regarding transport service providing means may be information for confirming the user's use of transport service to the mobile terminal 100. For example, the information regarding transport service providing means may include at least one of identification information of a vehicle, information regarding a current location of the vehicle, information regarding estimated time of arrival, information regarding a driver, information regarding user evaluations, information regarding authentications, and information regarding an estimated amount for payment.

According to an embodiment of the present invention, when one transport service providing means satisfying the transport service accessing conditions is extracted, the transport service managing server 200 may transmit information regarding the extracted transport service providing means to the mobile terminal 100. If a plurality of transport service providing means are extracted, the transport service managing server 200 may transmit information regarding a transport service providing means selected by a user from a list of the plurality of transport service providing means to the mobile terminal 100.

In an operation 1540, the transport service managing server 200 may transmit service request information including user information to the transport service providing means satisfying the transport service accessing conditions.

For example, the transport service managing server 200 may transmit service request information including at least one of identification information regarding the user, contact information of the user, and information regarding a location of the user to the transport service providing means.

In an operation 1550, when the transport service providing means is available for providing transport service to the user, the transport service managing server 200 may receive a result that the mobile terminal 100 confirms the user's use of the transport service. For example, the transport service managing server 200 may receive a result that the mobile terminal 100 confirmed the user's use of transport service by comparing information acquired from the transport service providing means to information regarding the transport service providing means that is received from the transport service managing server 200 from the mobile terminal 100.

When the user's use of transport service is successfully confirmed on the mobile terminal 100, the transport service managing server 200 may receive information regarding an origin of departure and information regarding time of departure from the mobile terminal 100 or the transport service providing means.

Meanwhile, when the user finishes using the transport service (e.g., the transport service providing means arrives at a destination of the user), the transport service managing server 200 may receive information regarding the destination and information regarding time of arrival from the transport service providing means or the mobile terminal 100. Next, the transport service managing server 200 may calculate transport service fare of the user for using the transport service based on the information regarding the origin of departure, the information regarding time of departure, the information regarding the destination, and information regarding time of arrival of the transport service providing means.

In an operation 1560, the transport service managing server 200 may transmit information regarding transport service fare to at least one from between the mobile terminal 100 and the transport service providing means.

Meanwhile, when the user finishes using the transport service, the transport service managing server 200 may receive information regarding user evaluation on the transport service providing means from the mobile terminal 100. Here, according to an embodiment of the present invention, the transport service managing server 200 may receive a request for adding the transport service providing means to a favorite menu from the mobile terminal 100.

Figure 16:
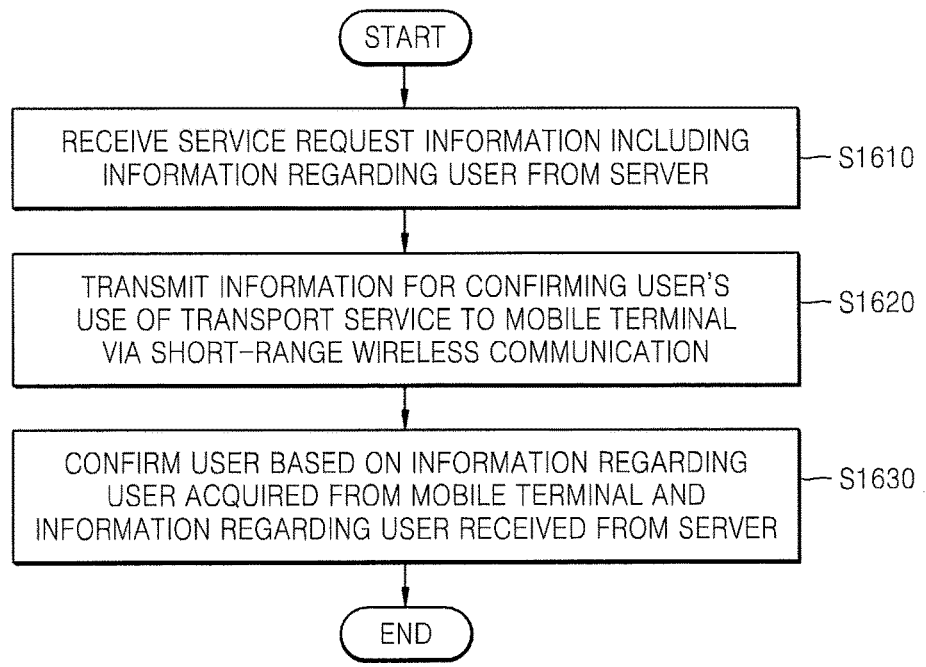
FIG. 16 is a flowchart for describing a method by which a transport service providing means provides transport service, according to an embodiment of the present invention.

FIG. 16 is a flowchart for describing a method by which a transport service providing means provides transport service, according to an embodiment of the present invention.

In an operation 1610, the transport service providing vehicle 300 may receive a service request information including information regarding a user who demands to user transport service from the transport service managing server 200. In this case, the transport service providing vehicle 300 may provide transport service to the user in response to the service request.

In an operation 1620, when the transport service providing vehicle 300 is available for providing transport service to the user, the transport service providing vehicle 300 may transmit information for confirming the user's use of transport service to the mobile terminal 100 via a short-range wireless communication.

The information for confirmation may include at least one from between information regarding the transport service providing vehicle 300 and information regarding a driver thereof. Furthermore, according to an embodiment of the present invention, the transport service providing vehicle 300 is available for providing transport service to a user when the transport service fare is within a communicable range from the mobile terminal 100.

According to an embodiment of the present invention, when the user contacts the mobile terminal 100 to a NFC device of the transport service providing vehicle 300, the transport service providing vehicle 300 may transmit information for confirming use of transport service to the mobile terminal 100 via the NFC. According to other embodiments of the present invention, the transport service providing vehicle 300 may also transmit information for confirming use of transport service to the mobile terminal 100 via BLUETOOTH, Wi-Fi, ZIGBEE, or WFD.

Meanwhile, according to another embodiment of the present invention, a barcode, a color code, or the like including information for confirming use of transport service may be attached to a transport service providing means. The barcode may include not only 1-dimensional (1D) barcode, but also 2-dimensional (2D) barcode. An example of 2D barcodes includes a quick response (QR) code.

According to an embodiment of the present invention, the information for confirming a user's use of transport service transmitted from the transport service providing vehicle 300 to the mobile terminal 100 may be compared to the information regarding transport service providing means received from the transport service managing server 200 by the mobile terminal 100.

In an operation 1630, the transport service providing vehicle 300 may confirm the user based on user information acquired from the mobile terminal 100 via a short-range wireless communication and user information received from the transport service managing server 200. The user information may include at least one of identification information regarding the user, contact information of the user, and information regarding a location of the user. The identification information regarding the user may include name, an ID, age, a nickname, a picture, gender, and date of birth of the user, for example.

For example, if the user information received from the transport service managing server 200 includes 'name: ooo, ID: ABC, age: 27, gender: female' and the information received from the mobile terminal 100 also includes 'name: ooo, ID: ABC, age: 27, gender: female,' the user is successfully confirmed. However, if the user information received from the transport service managing server 200 includes 'name: ooo, ID: ABC, age: 27, gender: female' and the information received from the mobile terminal 100 also includes 'name: xxx, ID: def, age: 25, gender: female,' confirmation of the user fails.

In other words, according to an embodiment of the present invention, the transport service providing vehicle 300 may easily confirm a user who requested transport service via a short-range wireless communication with the mobile terminal 100.

Figure 17:
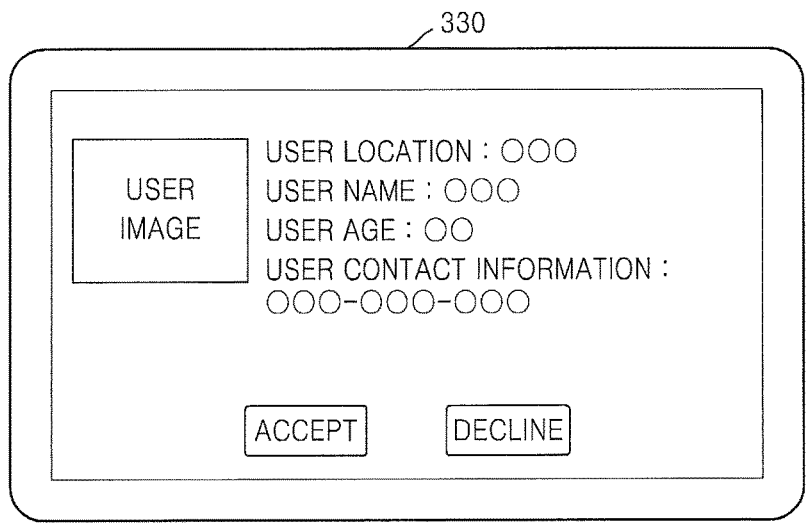
FIG. 17 is a diagram showing service request information according to an embodiment of the present invention.

FIG. 17 is a diagram showing service request information according to an embodiment of the present invention.

As shown in FIG. 17, the transport service providing vehicle 300 may receive information regarding a user who requested transport service from the transport service managing server 200 and display the information. For example, the transport service providing vehicle 300 may display a picture of the user, a location of the user, name of the user, age of the user, and contact information of the user.

Here, a driver of the transport service providing vehicle 300 may check the information regarding the user and may accept or decline a service request. According to an embodiment of the present invention, the transport service providing vehicle 300 may transmit an accept message or a decline message with respect to a service request to the transport service managing server 200.

Figure 18A:
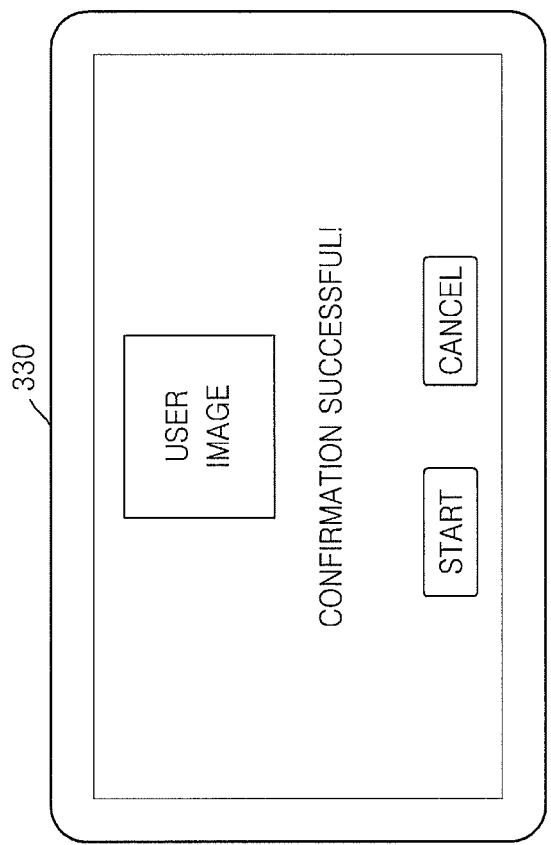
FIGS. 18A and 18B are diagrams for describing user confirmation of a transport service providing means according to an embodiment of the present invention.
Figure 18B:
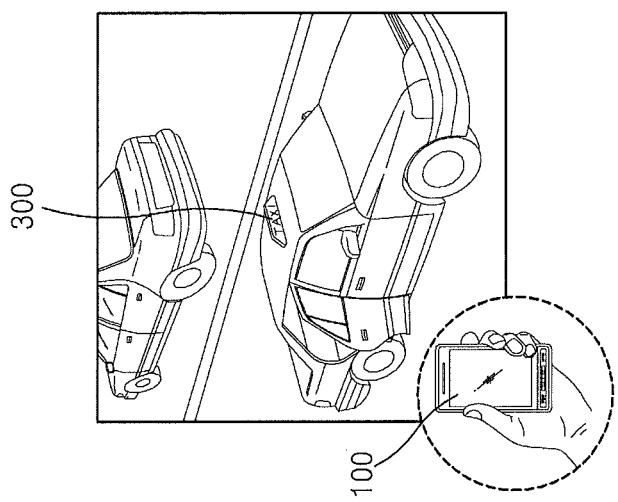

FIG. 18 is a diagram for describing user confirmation of a transport service providing means according to an embodiment of the present invention.

As shown in FIG. 18(*a*), a user may contact the mobile terminal 100 to a NFC device of the transport service providing vehicle 300. In this case, the transport service providing vehicle 300 may transmit at least one from between information regarding the transport service providing vehicle 300 and information regarding a driver thereof to the mobile terminal 100. Furthermore, the transport service providing vehicle 300 may receive information regarding the user from the mobile terminal 100.

As shown in FIG. 18(*b*), the transport service providing vehicle 300 may compare information regarding the user received from the transport service managing server 200 to information regarding the user received from the mobile terminal 100, and, if the information regarding the user received from the transport service managing server 200 matches to the information regarding the user received from the mobile terminal 100 by a predetermined ratio or a higher ratio, the transport service providing vehicle 300 may display a message saying that the user is successfully confirmed.

Figure 19:
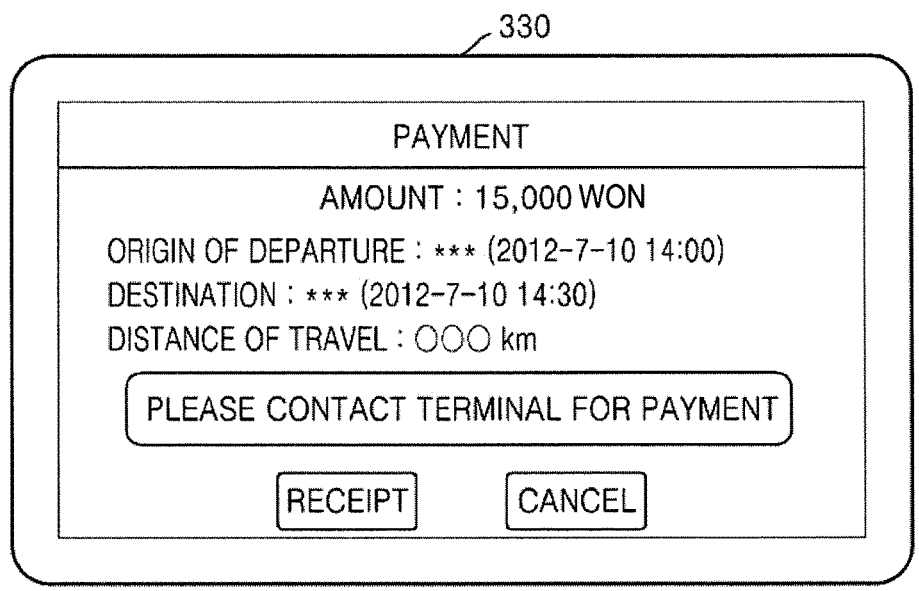
FIG. 19 is a diagram for describing a method by which a transport service providing vehicle processes fare payment, according to an embodiment of the present invention.

FIG. 19 is a diagram for describing a method by which a transport service providing vehicle processes fare payment, according to an embodiment of the present invention.

According to an embodiment of the present invention, when the transport service providing vehicle 300 is available for providing transport service to a user, the transport service providing vehicle 300 may transmit information regarding an origin of departure and information regarding time of departure to the transport service managing server 200. Furthermore, when the transport service providing vehicle 300 arrives at a destination of the user, the transport service providing vehicle 300 may transmit information regarding the destination and information regarding time of arrival to the transport service providing vehicle 300.

Here, the transport service providing vehicle 300 may receive information regarding transport service fare of the user from the transport service managing server 200 and display the information. For example, as shown in FIG. 19, the transport service providing vehicle 300 may display information regarding an amount for payment, an origin of departure, time of departure, a destination, time of arrival, distance of travel, and time of travel.

According to an embodiment of the present invention, the transport service providing vehicle 300 may receive information regarding payment methods associated with the user from the mobile terminal 100 of the user and may process a payment of transport service fare based on the received information regarding payment methods. In other words, the transport service providing vehicle 300 may transmit information regarding payment methods and request a payment approval to a payment server simultaneously.

The transport service providing vehicle 300 according to an embodiment of the present invention may also print out a receipt. Furthermore, when the user finishes using transport service, the transport service providing vehicle 300 according to an embodiment of the present invention may receive information regarding user evaluations regarding the transport service providing vehicle 300 from the transport service managing server 200.

Figure 20:
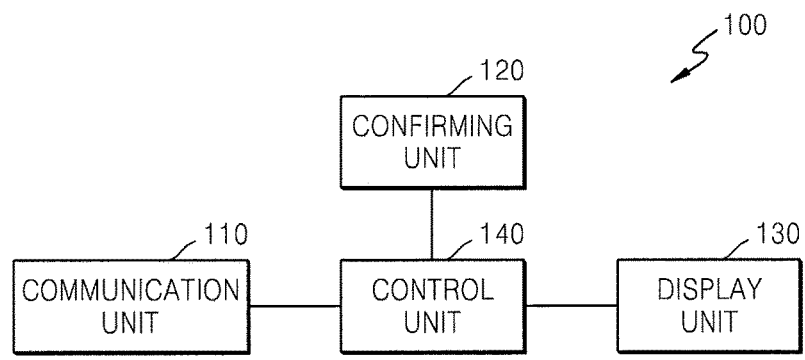
FIG. 20 is a block diagram for describing a mobile terminal according to an embodiment of the present invention.

FIG. 20 is a block diagram for describing a mobile terminal according to an embodiment of the present invention.

As shown in FIG. 20, the mobile terminal 100 according to an embodiment of the present invention may include a communication unit 110, a confirming unit 120, a display unit 130, and a control unit 140. However, not all of the components shown in FIG. 20 are necessary components. The mobile terminal 100 may be embodied with more or less components than the components shown in FIG. 20.

Detailed descriptions thereof will be given below.

The communication unit 110 may include one or more elements enabling a communication between the mobile terminal 100 and the transport service managing server 200 or between the mobile terminal 100 and the transport service providing vehicle 300. For example, the communication unit 110 may include a short-range wireless communication module, a location information module, and a wireless Internet module.

The short-range wireless communication module refers to a module for short-range wireless communication. Examples of technologies for short-range wireless communication may include Wi-Fi, BLUETOOTH, ZIGBEE, WFD, UWB, and infrared data association (IrDA). However, the present invention is not limited thereto.

The location information module is a module for checking or acquiring a location of the mobile terminal 100. An example thereof is a global positioning system (GPS) module. A GPS module receives location information from a plurality of satellites. Here, the location information may include coordinates indicated with longitudes and latitudes. The wireless internet module refers to a module for wirelessly accessing the internet, where the wireless Internet module may be arranged inside or outside the mobile terminal 100.

For a user to use a transport service, the communication unit 110 may transmit information regarding the user and transport service accessing condition information to the transport service managing server 200 and may receive information regarding transport service providing means corresponding to transport service accessing conditions from the transport service managing server 200. Here, according to an embodiment of the present invention, the communication unit 110 may receive a list of a plurality of transport service providing means corresponding to the transport service accessing conditions from the transport service managing server 200.

The communication unit 110 may transmit information regarding an origin of departure, information regarding time of departure, information regarding a destination, and information regarding time of arrival to the transport service managing server 200 and may receive information regarding transport service fare from the transport service managing server 200.

The communication unit 110 may transmit information regarding user evaluations on a transport service providing means to the transport service managing server 200.

When a transport service providing means is available for providing transport service to a user, the confirming unit 120 may confirm the user's use of transport service based on information acquired via a short-range wireless communication and information regarding transport service providing means received from the transport service managing server 200. In other words, the confirming unit 120 may compare the information acquired via a short-range wireless communication to the information regarding transport service providing means received from the transport service managing server 200.

According to an embodiment of the present invention, the confirming unit 120 may receive information regarding a transport service providing means from the transport service providing means via at least one of a short-range wireless communication, BLUETOOTH, Wi-Fi, WFD, UWB, ZIGBEE, a 2D barcode, and a color code.

The display unit 130 may display information processed by the mobile terminal 100. For example, the display unit 130 may display at least a part of information regarding transport service providing means received from the transport service managing server 200. Furthermore, the display unit 130 may display a list of a plurality of transport service providing means corresponding to transport service accessing conditions. The display unit 130 according to an embodiment of the present invention may also display information regarding payment methods associated with a user.

If the display unit 130 has a layered structure including a touch pad and is configured as a touch screen, the display unit 130 may not only be used as an output device, but also be used as an input device. The display unit 130 may include at least one of a liquid crystal display, a thin-film transistor liquid crystal display, an organic light emitting diode, a flexible display, a 3D display, an electrophoretic display, and a transparent display.

The control unit 140 generally controls the overall operation of the mobile terminal 100. In other words, the control unit 140 may control the overall operations of the communication unit 110, the confirming unit 120, and the display unit 130.

The control unit 140 may acquire link information for communicating with the transport service managing server 200. For example, the control unit 140 may acquire link information via at least one of a short-range wireless communication, a barcode, and an application.

The control unit 140 may receive a user selection regarding at least one transport service providing means from a list of a plurality of transport service providing means. As a user finishes using a transport service, the control unit 140 may process a payment via a short-range wireless communication with a transport service providing means. At this point, the control unit 140 may transmit information regarding payment methods associated with a user to the transport service providing means.

The control unit 140 may add a transport service providing means to a favourite menu based on an user input.

Figure 21:
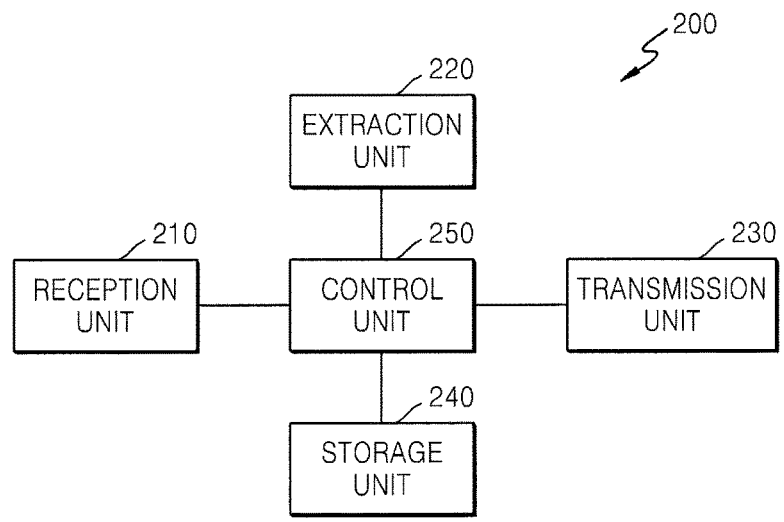
FIG. 21 is a block diagram for describing a transport service managing server according to an embodiment of the present invention.

FIG. 21 is a block diagram for describing a transport service managing server according to an embodiment of the present invention.

As shown in FIG. 21, the transport service managing server 200 according to an embodiment of the present invention may include a reception unit 210, an extraction unit 220, a transmission unit 230, a storage unit 240, and a control unit 250. However, not all of the components shown in FIG. 1 are necessary components. The transport service managing server 200 may include more or less components than the components shown in FIG. 21.

Detailed descriptions thereof will be given below.

For a user to use a transport service, the reception unit 210 may receive information regarding the user and transport service accessing condition information from the mobile terminal 100.

When a transport service providing means is available for providing transport service to a user, the reception unit 210 may receive a result of confirming the user's use of transport service at the mobile terminal 100 based on information acquired via a short-range wireless communication and information regarding transport service providing means received from the transport service managing server 200.

The reception unit 210 may receive a user selection regarding at least one transport service providing means from a list of transport service providing means.

When the mobile terminal 100 successfully confirms the user's use of transport service, the reception unit 210 may receive information regarding an origin of departure and information regarding time of departure from the mobile terminal 1000 or a transport service providing means/ Furthermore, when a transport service providing means arrives at a destination of the user, the reception unit 210 may receive information regarding the destination and information regarding time of arrival from the transport service providing means or the mobile terminal 100.

When the user finishes using transport service, the reception unit 210 may receive information regarding user evaluations on the transport service providing means from the mobile terminal 100. The reception unit 210 may receive a request to add the transport service providing means to a favourite menu from the mobile terminal 100.

The extraction unit 220 may extract a transport service providing means based on the transport service accessing condition information. For example, the extraction unit 220 may extract a transport service providing means corresponding to the transport service accessing condition information.

According to an embodiment of the present invention, the extraction unit 220 may also extract a plurality of transport service providing means corresponding to the transport service accessing condition information.

The transmission unit 230 may transmit information regarding transport service providing means to the mobile terminal 100 and may transmit a service request information including information regarding the user to the transport service providing means.

The transmission unit 230 may also transmit a list of a plurality of transport service providing means extracted by the extraction unit 220. Furthermore, the transmission unit 230 may transmit information regarding transport service fare to at least one from between the mobile terminal 100 and the transport service providing means.

The storage unit 240 may store a program for the control unit 250 to process and control. Furthermore, the storage unit 240 may store input/output data. For example, the storage unit 240 may store information regarding the user or information regarding transport service providing means. In other words, the storage unit 240 may store information regarding an ID of a user, a password of the user, a picture of the user, name of the user, date of birth of the user, gender of the user, favorite menu of the user, etc. Furthermore, the storage unit 240 may store identification information regarding a vehicle, information regarding type of the vehicle, information regarding additional equipment of the vehicle, name of a driver, driving experience of the driver, gender of the driver, and user evaluation information The control unit 250 generally controls the overall operations of the transport service managing server 200. In other words, the control unit 250 may control the reception unit 210, the extraction unit 220, the transmission unit 230, and the storage unit 240.

The control unit 250 may calculate transport service fare of the user based on information regarding an gin of departure, information regarding time of departure, information regarding a destination, and information regarding time of arrival that are received from the mobile terminal 100 or a transport service providing means.

Figure 22:
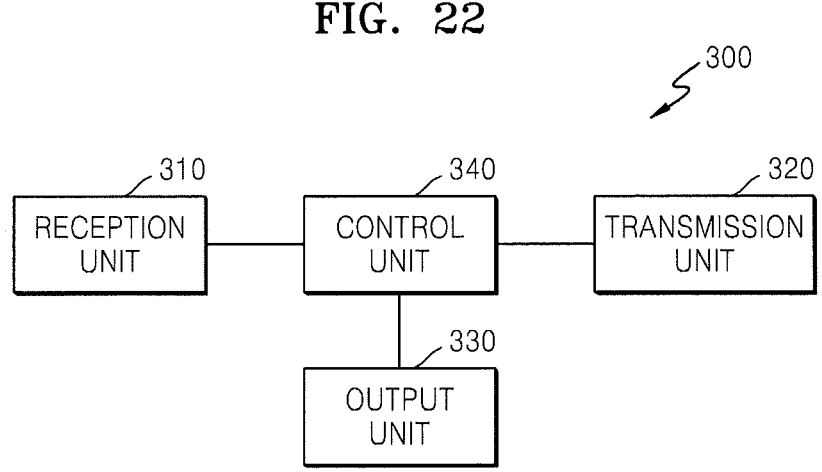
FIG. 22 is a block diagram for describing a transport service providing vehicle according to an embodiment of the present invention.

FIG. 22 is a block diagram for describing a transport service providing vehicle according to an embodiment of the present invention.

As shown in FIG. 22, the transport service providing vehicle 300 may include a reception unit 310, a transmission unit 320, an output unit 330, and a control unit 340. However, not all of the components shown in FIG. 22 are necessary components. The transport service providing vehicle 300 may include more or less components than the components shown in FIG. 22.

Detailed descriptions thereof will be given below.

The reception unit 310 may receive a service request information including information regarding a user who wants to use a transport service from the transport service managing server 200. When the user finishes using a transport service, the reception unit 310 may receive information regarding transport service fare from the transport service managing server 200.

The reception unit 310 may receive information regarding payment methods associated with the user from the mobile terminal 100 of the user. Here, the reception unit 310 may receive the information regarding payment methods associated with the user via a short-range wireless communication.

When the user finishes using a transport service, the reception unit 310 may receive information regarding user evaluations on the transport service providing vehicle 300 from the transport service managing server 200.

When the transport service providing vehicle 300 is available for providing a transport service to the user, the transmission unit 320 may transmit information for confirming the user's use of transport service to the mobile terminal 100 of the user via a short-range wireless communication. Examples of technologies for short-range wireless communication may include Wi-Fi, BLUETOOTH, ZIGBEE, WFD, UWB, and infrared data association (IrDA). However, the present invention is not limited thereto.

When the transport service providing vehicle 300 arrives at a destination of the user, the transmission unit 320 may transmit information regarding the destination and information regarding time of arrival to the transport service managing server 200.

The output unit 330 is a unit for outputting audio signals, video signals, or alarm signals and may include a display unit, an audio output module, and an alarm unit.

The display unit displays information processed by the transport service providing vehicle 300. For example, the display unit may display service request information including information regarding a user that is received from the transport service managing server 200. Furthermore, when the user is successfully confirmed, the display unit may display a confirmation success message. Meanwhile, the display unit may also display information regarding transport service fare of a user that is received from the transport service providing vehicle 300.

The display unit may include at least one of a liquid crystal display, a thin-film transistor liquid crystal display, an organic light emitting diode, a flexible display, a 3D display, an electrophoretic display, and a transparent display.

The control unit 340 generally controls the overall operations of the transport service providing vehicle 300. In other words, the control unit 340 may control the reception unit 310, the transmission unit 320, and the output unit 330.

The control unit 340 may confirm a user based on information acquired from the mobile terminal 100 via a short-range wireless communication and information regarding the user received from the transport service managing server 200.

The control unit 340 may also process a payment for transport service fare based on information regarding payment methods received from the mobile terminal 100. In other words, the control unit 340 may transmit a payment request approval including information regarding payment methods and information regarding transport service fare to a payment server.

Although the descriptions are given above with respect to a taxi service, the present application may also be applied to a vehicle rental service or a delivery service. For example, the mobile terminal 100 may confirm whether a vehicle parked at a particular location is a vehicle rented by a user via a short-range wireless communication with the vehicle. Furthermore, when a package or food is delivered, the mobile terminal 100 may confirm delivery service via a short-range wireless communication with a delivery vehicle.

The invention can also be embodied as program instructions on a computer readable recording medium. The computer-readable medium may include program instructions, data files, data structures, and/or combinations thereof. Program instructions that are written to the medium may be specially designed and constructed for the present invention or may be known to those skilled in computer software. Examples of the computer readable recording medium include magnetic media, such as a hard disk, a floppy disk, and a magnetic tape, optical media, such as a CD-ROM and a DVD, magneto-optical media, such as a floptical disk, and hardware devices particularly constructed for storing and executing program instructions, such as a ROM, a RAM, and a flash memory. Examples of the program instructions include not only machine language codes generated by a compiler, but also high-level language codes that may be executed on a computer via an interpreter.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method by which a mobile terminal provides transport service information, the method comprising:
   receiving, by a user interface of the mobile terminal, information regarding a user and information regarding a transport service preferred by the user;
   acquiring, by a communicator of the mobile terminal, link information of a transport service managing server based on a fixed location of an external device which manages the link information of the transport service managing server through a short-range wireless communication with the external device;
   transmitting, by the communicator of the mobile terminal, the information regarding the user and the information regarding the transport service preferred by the user to the transport service managing server using the link information;
   receiving, by the communicator of the mobile terminal, information regarding a transport service provider corresponding to the transmitted information regarding the transport service preferred by the user, from the transport service managing server;
   acquiring, by the communicator of the mobile terminal via a short-range wireless communication with an available transport service provider, information regarding the available transport service provider; and
   confirming, by a controller of the mobile terminal, whether the available transport service provider corresponds to the transport service preferred by the user, by comparing the received information regarding the transport service provider to the acquired information from the available transport service provider.

2. The method of claim 1, wherein the acquiring of the link information comprises acquiring the link information via at least one of a short-range wireless communication, a barcode, and an application.

3. The method of claim 1, wherein the information regarding the transport service preferred by the user comprises at least one of information regarding conditions for a vehicle, information regarding conditions for a driver, information regarding an origin of departure, information regarding a destination, and information regarding payment methods.

4. The method of claim 3, wherein the information regarding conditions for a vehicle comprises at least one of information regarding type of the vehicle, information regarding color of the vehicle, information regarding the maximum number of passengers, information regarding additional equipment on the vehicle information regarding out-of-factory date of the vehicle, information regarding accident history of the vehicle, information regarding total mileage of the vehicle, and information regarding terms the vehicle was rented for, and
   the information regarding conditions for a driver comprises at least one of gender of the driver, age of the driver, driving experience of the driver, and user evaluations on the driver.

5. The method of claim 1, wherein the information regarding transport service provider comprises at least one of identification information regarding a vehicle, information regarding a current location of the vehicle, information regarding estimated time of arrival, information regarding a driver, information regarding user evaluations, information regarding authentication, and information regarding estimated amount for payment.

6. The method of claim 1, wherein the receiving of the information regarding transport service provider comprises:
   receiving a list of a plurality of transport service providers corresponding to the information regarding the transport service preferred by the user from the transport service managing server; and
   receiving a user selection of at least one transport service provider from the list of the plurality of transport service providers.

7. The method of claim 6, wherein the list of transport service providers comprises information regarding at least one of identification information, current locations, wait times, operation status, driver identifications, and user evaluations regarding the respective vehicles corresponding to the information regarding the transport service preferred by the user.

8. The method of claim 1, wherein the confirming of whether an available transport service provider corresponds to the transport service preferred by the user comprises acquiring the information regarding the transport service provider from the transport service provider using the short-range wireless communication.

9. The method of claim 1, further comprising, as the user finishes using the transport service, processing a payment via the short-range wireless communication with the transport service provider.

10. The method of claim 9, wherein the processing of the payment comprises transmitting information regarding payment methods associated with the user to the transport service provider via the short-range wireless communication.

11. The method of claim 1, further comprising transmitting information regarding the user's evaluations on the transport service provider to the transport service managing server.

12. The method of claim 1, further comprising adding the transport service provider to a favorite menu based on an input of the user.

13. A mobile terminal comprising:
at least one memory configured to store instructions; and
at least one processor configured to execute the stored instructions to perform a method including:
receiving, by a user interface of the mobile terminal, information regarding a user and information regarding a transport service preferred by the user;
acquiring, by a communicator of the mobile terminal, link information of a transport service managing server based on a fixed location of an external device which manages the link information of the transport service managing server through a short-range wireless communication with external device;
transmitting, by the communicator of the mobile terminal, the information regarding the user and the information regarding the transport service preferred by the user to the transport service managing server using the link information;
receiving, by the communicator of the mobile terminal, information regarding a transport service provider corresponding to the transmitted information regarding the transport service preferred by the user, from the transport service managing server;
acquiring, by the communicator of the mobile terminal via a short-range wireless communication with an available transport service provider, information regarding the available transport service provider; and
confirming, by a controller of the mobile terminal, whether the available transport service provider corresponds to the transport service preferred by the user, by comparing the received information regarding the transport service provider to the acquired information from the available transport service provider.

14. The mobile terminal of claim 13, wherein the at least one processor is further configured to control a display of the mobile terminal to display at least a part of the received information regarding the transport service provider.

15. A non-transitory computer readable recording medium having recorded thereon a computer program for implementing the method of providing transport service information, the method comprising:
receiving, by a user interface of the mobile terminal, information regarding a user and information regarding a transport service preferred by the user;
acquiring, by a communicator of the mobile terminal, link information of a transport service managing server based on a fixed location of an external device which manages the link information of the transport service managing server through a short-range wireless communication with the external device;
transmitting, by the communicator of the mobile terminal, the information regarding the user and the information regarding the transport service preferred by the user to the transport service managing server using the link information;
receiving, by the communicator of the mobile terminal, information regarding a transport service provider corresponding to the transmitted information regarding the transport service preferred by the user, from the transport service managing server;
acquiring, by the communicator of the mobile terminal via a short-range wireless communication with an available transport service provider, information regarding the available transport service provider; and
confirming, by a controller of the mobile terminal, whether the available transport service provider corresponds to the transport service preferred by the user, by comparing the received information regarding the transport service provider to the acquired information from the available transport service provider.

* * * * *